(12) United States Patent
Hawthorne et al.

(10) Patent No.: US 11,442,192 B2
(45) Date of Patent: Sep. 13, 2022

(54) METHODS AND SYSTEMS FOR QUANTIFICATION OF NAPL TRANSMISSIVITY

(71) Applicant: GEI CONSULTANTS, INC., Woburn, MA (US)

(72) Inventors: John Michael Hawthorne, Denver, CO (US); Lisa Allison Reyenga, Denver, CO (US)

(73) Assignee: GEI Consultants, Inc., Woburn, MA (US)

( * ) Notice: Subject to any disclaimer, the term of this patent is extended or adjusted under 35 U.S.C. 154(b) by 420 days.

(21) Appl. No.: 16/346,238

(22) PCT Filed: Nov. 3, 2017

(86) PCT No.: PCT/US2017/059953
§ 371 (c)(1),
(2) Date: Apr. 30, 2019

(87) PCT Pub. No.: WO2018/085669
PCT Pub. Date: May 11, 2018

(65) Prior Publication Data
US 2020/0049851 A1    Feb. 13, 2020

Related U.S. Application Data

(60) Provisional application No. 62/566,470, filed on Oct. 1, 2017, provisional application No. 62/417,049, filed on Nov. 3, 2016.

(51) Int. Cl.
*G01V 1/50* (2006.01)
*E21B 47/06* (2012.01)
(Continued)

(52) U.S. Cl.
CPC ............... *G01V 1/50* (2013.01); *E21B 47/06* (2013.01); *E21B 49/008* (2013.01);
(Continued)

(58) Field of Classification Search
CPC .... G01V 1/50; G01V 2210/663; E21B 47/06; E21B 49/008; G01N 21/59; A61K 9/14
See application file for complete search history.

(56) References Cited

U.S. PATENT DOCUMENTS 5,733,067 A * 3/1998 Hunt ..................... E02D 3/00
210/610
2002/0047058 A1* 4/2002 Verhoff ................. A61K 9/14
241/26

FOREIGN PATENT DOCUMENTS

WO    2009/137826 A2    11/2009

OTHER PUBLICATIONS

Cl:aire "An illustrated Handbook of LNAPL Transport and Fate in the Subsurface" or "Light Non-Aqueous Phase Liquid (LNAPL) Update 3. Key LNAPL Concepts." (Year: 2009).*
(Continued)

*Primary Examiner* — Catherine T. Rastovski
*Assistant Examiner* — Kaleria Knox
(74) *Attorney, Agent, or Firm* — Kilpatrick Townsend & Stockton LLP

(57) ABSTRACT

Methods and systems for evaluating a distribution and recoverability of a light non-aqueous phase liquid (LNAPL) or a dense non-aqueous phase liquid (DNAPL) in fractured substrate are provided. Also provided are methods and systems for evaluating a distribution and recoverability of a light non-aqueous phase liquid (LNAPL) or a dense non-aqueous phase liquid (DNAPL) in other substrates, including a layered porous media substrate. Also provided are methods and systems for calibrations related to DNAPL transmissivity.

19 Claims, 16 Drawing Sheets

(51) Int. Cl.
    *E21B 49/00*           (2006.01)
    *E21B 49/08*           (2006.01)
    *G01N 21/59*          (2006.01)

(52) U.S. Cl.
    CPC ........... *E21B 49/088* (2013.01); *G01N 21/59* (2013.01); *G01V 2210/663* (2013.01)

(56) References Cited

OTHER PUBLICATIONS

"Real-Time Monitoring of Water and DNAPL Levels Using Level TROLL 500 Instruments". (Year: 2011).*
"API LNAPL Transmissivity Workbook: A Tool for Baildown Test Analysis". (Year: 2016).*
International Application No. PCT/US2017/059953, International Search Report/Written Opinion, dated Feb. 23, 2018, 17 pgs.
CL:AIRE, 2014, "An Illustrated Handbook of LNAPL Transport and Fate in the Subsurface," CL:AIRE, London, ISBN 978-1-905046-24-9, www.claire.co.uk/LNAPL/.
Real-Time Monitoring of Water and DNAPL Levels Using Level TROLL 500 Instruments, C.C. Lynch & Associates, Inc., Sep. 25, 2012, http://www.cclynch.com/real-time-monitoring-of-water-and-dnapl-levels-using-level-troll-500-instruments-2/.
"API LNAPL Transmissivity Workbook: A Tool for Baildown Test Analysis," Apr. 1, 2016, http://www.api.org/~/media/4762%20NAPL%20Tn%20wkbk%20Baildown%20userquid%20Apr2016%20%282%29.pdf.
Newell, C.J., et al., "Light Nonaqueous Phase Liquids," EPA Ground Water Issue, 1996, https://www.epa.gov/sites/production/files/2015-06/documents/lnapl.pdf.

* cited by examiner

METHODS AND SYSTEMS FOR QUANTIFICATION OF NAPL TRANSMISSIVITY

CROSS-REFERENCES TO RELATED APPLICATIONS

This application is a U.S. national phase of International Application PCT/US2017/059953 filed Nov. 3, 2017, which claims priority to U.S. Provisional Application No. 62/417,049 filed Nov. 3, 2016, and U.S. Provisional Application No. 62/566,470, filed Oct. 1, 2017, each of which is incorporated herein by reference in its entirely.

FIELD

Described herein are methods and systems for evaluating the distribution and recoverability of non-aqueous phase liquids.

BACKGROUND

The recoverability of coal tar and other non-aqueous phase liquids (NAPL) is difficult to evaluate, resulting in operating recovering wells longer than is necessary. The extended operation period is very costly. By accurately targeting coal tar NAPL underground, a remedy can be precisely designed to ensure it is both cost conscious and technically effective.

The hydraulic recoverability of non-aqueous phase liquid (NAPL) in a subsurface comprising fractured porous media has been difficult to determine using existing methodology. Similar challenges are also present in a subsurface comprising a layered arrangement of granular porous media and non-porous media. The hydraulic recoverability of dense non-aqueous phase liquid (DNAPL) has been particularly difficult to determine. The existing methods produce conceptual models that may grossly over-estimate the amount of NAPL present, which may result in incorrect remediation system designs and/or operating a recovery well longer than necessary. This extended operation period may be very costly. By accurately quantifying the location and hydraulic recoverability of NAPL present in a subsurface, an improved NAPL conceptual site model can be generated resulting in a more cost-effective and technically effective remediation plan.

Therefore, methods and systems are needed to produce conceptual models that accurately determine the hydraulic recoverability of NAPL in a subsurface comprising fractured porous media or a layered arrangement of granular porous media and non-porous media. Methods and systems are also needed to determine recoverability of dense non-aqueous phase liquid (DNAPL) in porous media, layered granular porous and non-porous media, and fractured porous media. Described herein are new methods and systems to accurately determine the amount of recoverable NAPL in the subsurface.

SUMMARY

Described herein are methods and systems for evaluating a distribution and recoverability of a non-aqueous phase liquid (NAPL). The invention may be embodied in a variety of ways.

In some embodiments, the invention may comprise a method of evaluating a distribution and recovery of a non-aqueous phase liquid (NAPL) in a subsurface. The method may comprise the step of identifying a plurality of mobile non-aqueous phase liquid intervals (MNI) in the subsurface. The method may further comprise the step of determining a transmissivity of a non-aqueous phase liquid (NAPL) in the subsurface.

In certain embodiments, the non-aqueous phase liquid (NAPL) may comprise light non-aqueous phase liquid (LNAPL). Also, in some embodiments, the non-aqueous phase liquid may comprise dense non-aqueous phase liquid (DNAPL).

When the NAPL is LNAPL, the determining the transmissivity of the non-aqueous phase liquid (NAPL) may comprise gauging the subsurface through a well to determine an apparent air NAPL interface (ANI), calculating an elevation of the apparent air NAPL interface (ANI) in the subsurface, and recording the elevation of the apparent air NAPL interface (ANI). Also, the method may comprise gauging the subsurface through a well to determine a NAPL water interface (NWI) in the subsurface, calculating an elevation of the NAPL water interface (NWI) in the subsurface, and recording the elevation of the NAPL water interface (NWI).

When the NAPL is DNAPL, the determining the transmissivity of the non-aqueous phase liquid (NAPL) may comprise gauging the subsurface through a well to determine an apparent NAPL water interface (NWI) (as DNAPL is generally denser than groundwater), calculating an elevation of the apparent NAPL water interface (NWI) in the subsurface, and recording the elevation of the apparent NAPL water interface (NWI). Also, the method may comprise gauging the subsurface through a well to determine the base of the NAPL in the subsurface and the total depth (TD) of the well, calculating an elevation of the base of the DNAPL in the subsurface, and recording the elevation of the base of the DNAPL and well TD. In some cases, the method may further comprise the step of determining a high resolution mobile interval definition of the NAPL. In some cases, the method may further comprise integrating the definition into a conceptual site model.

In some embodiments for both LNAPL and DNAPL, identifying the mobile non-aqueous phase liquid intervals (MNI) may comprise removing an amount of non-aqueous phase liquid (NAPL) from the subsurface through a well, monitoring an apparent drawdown of the non-aqueous phase liquid (NAPL) in the well, monitoring a discharge rate of the non-aqueous phase liquid (NAPL) in the well from an area of the subsurface comprising non-aqueous phase liquid (NAPL) near the well, analyzing a rate of change for the discharge rate, analyzing a rate of change for the drawdown, and determining when the rate of change for the discharge rate and drawdown are substantially zero.

In certain embodiments, the testing of the transmissivity of the DNAPL may comprise a calibration method comprising placing a first transducer in the DNAPL; recording a first pressure measurement from the first transducer, and calculating an elevation of the DNAPL. Also, the method may comprise placing a second transducer in a water column near the DNAPL, recording a second pressure measurement from the second transducer, calculating an elevation of the water column, and comparing the elevation of the DNAPL to the elevation of the water column to determine a thickness of DNAPL. In some embodiments, determining a high resolution mobile interval definition of the DNAPL may comprise measuring a first specific gravity of the DNAPL, measuring a second specific gravity of a water column, and performing a calibration using the first and second specific gravity measurements. Also, the method may comprise performing the calibration further comprises repeating said measurements of the specific gravity to refine the definition of the DNAPL.

In certain embodiments, the subsurface may comprise a fractured porous media. In some embodiments, the subsurface may comprise a layered arrangement of granular porous media and non-porous media. In some embodiments, the subsurface may comprise granular porous media. In some embodiments, the subsurface may comprise karst.

Also disclosed herein are systems for evaluating a distribution and recovery of a non-aqueous phase liquid (NAPL) in a subsurface. In certain embodiments, the system may comprise a first component for determining a transmissivity of a non-aqueous phase liquid (NAPL) in the subsurface. In some embodiments, the system may further comprise a second component for identifying a plurality of mobile non-aqueous phase liquid (NAPL) intervals (MNI) in the subsurface. In some embodiments, the system may comprise a component for integrating the mobile interval definition into a conceptual site model.

In certain embodiments, the component for testing the transmissivity of the DNAPL may comprise: a first transducer configured to be positioned in the dense non-aqueous phase liquid, so as to record a first pressure measurement; and a second transducer configured to be positioned in a water column near the DNAPL so as to record a second pressure measurement. Also, in some embodiments, the component for determining a high resolution mobile interval definition of the DNAPL may comprise an element to calculate an elevation of the DNAPL based on the first pressure measurement, and an elevation of the water column based on the second pressure measurement, so as to compare the elevation of the DNAPL to the elevation of the water column to determine a thickness of the DNAPL. In some embodiments, the determining a high resolution mobile interval definition of the DNAPL comprises measuring a first specific gravity of the DNAPL, measuring a second specific gravity of a water column, and performing a calibration using the first and second specific gravity measurements. In yet further embodiments, performing the calibration further comprises repeating said measurements of the specific gravity to refine the definition of the dense non-aqueous phase liquid. Each of the embodiments disclosed herein for the methods may be used in the systems of the invention.

DESCRIPTION OF THE DRAWINGS

The invention may be further understood by reference to the following non-limiting figures.

DETAILED DESCRIPTION

Figure 1:
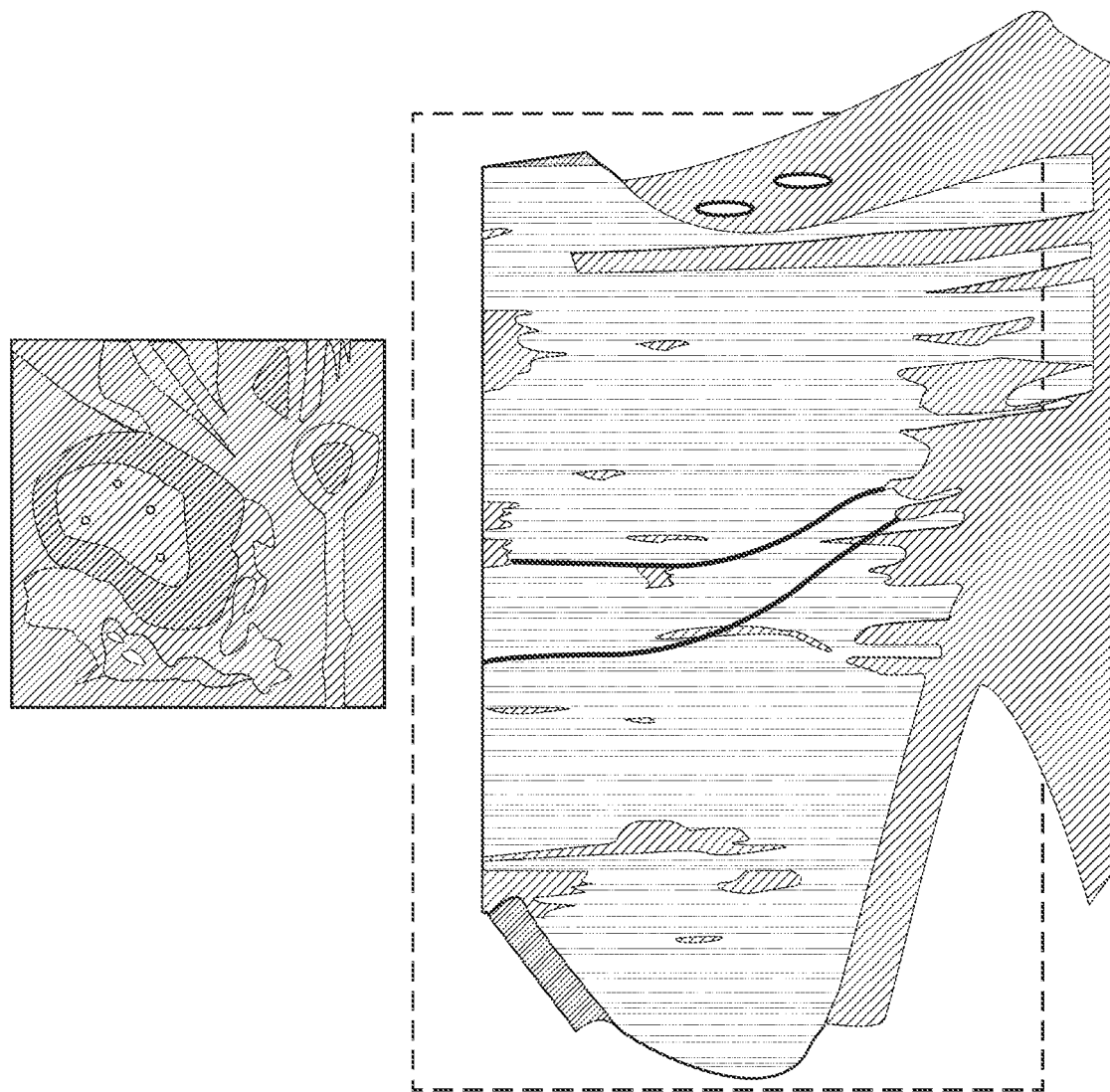
FIG. 1 is a graphical presentation of the site data from the conceptual site model (CSM).

Described herein are methods and systems for evaluating a distribution and recoverability of a non-aqueous phase liquid (NAPL). The invention may be embodied in a variety of ways.

Non-aqueous phase liquid (NAPL) transmissivity is a metric that may be used to quantify the hydraulic recoverability of NAPL. Existing methods developed have been used to measure LNAPL transmissivity within a general granular porous media, and their use may fail to reliably quantify NAPL transmissivity in fractured porous media. These shortfalls in existing NAPL transmissivity calculations in fractured porous media neglected to consider key measurements of the geometry and discharge rate for individual fractures containing mobile NAPL. A modification of NAPL transmissivity measurement and calculation methods designed for granular porous media may provide improved measurement of NAPL transmissivity in fractured porous media at the individual fracture and aggregate well scales. Thus, this process may afford the use of NAPL transmissivity as a metric to define if NAPL hydraulic recovery is necessary for a given fracture or well.

Similarly, existing methods may fail to reliably quantify NAPL transmissivity in multiple interbedded porous and non-porous media. A modification of NAPL transmissivity measurement and calculation methods designed for granular porous media may provide improved measurement of NAPL transmissivity in multiple interbedded porous and non-porous media at the individual fracture and aggregate well scales. Thus, this process may afford the use of NAPL transmissivity as a metric to define if NAPL hydraulic recovery is necessary for a given fracture or well.

By accurately quantifying the hydraulic recoverability of NAPL present in a subsurface, an improved NAPL conceptual site model may be generated resulting in a more cost-effective remediation plan. The improved conceptual model may also provide for closure of remediation sites, design better remediation strategies and remedies for contaminated sites, and may reduce costs of remediation.

In some embodiments, the invention may comprise a method of evaluating a distribution and recovery of a non-aqueous phase liquid (NAPL) in a subsurface. The method may comprise the step of identifying a plurality of mobile non-aqueous phase liquid intervals (MNI) in the subsurface. The method may further comprise the step of determining a transmissivity of a non-aqueous phase liquid (NAPL) in the subsurface.

In certain embodiments, the non-aqueous phase liquid (NAPL) may comprise light non-aqueous phase liquid (LNAPL). Examples of LNAPL include, but are not limited to, gasoline, benzene, toluene, xylene, and other hydrocarbons. Also, in some embodiments, the non-aqueous phase liquid may comprise dense non-aqueous phase liquid (DNAPL). Examples of DNAPL include, but are not limited to, coal tar, creosote, chlorinated solvents, polychlorinated biphenyl (PCBs), mercury, and extra heavy crude oil.

As noted herein, the disclosed methods may be used for quantifying both LNAPL and/or DNAPL. In certain embodiments for LNAPL, the determining the transmissivity of the non-aqueous phase liquid (NAPL) may comprise gauging the subsurface through a well to determine an apparent air NAPL interface (ANI), calculating an elevation of the apparent air NAPL interface (ANI) in the subsurface, and recording the elevation of the apparent air NAPL interface (ANI). Also, the method may comprise gauging the subsurface through a well to determine a NAPL water interface (NWI) in the subsurface, calculating an elevation of the NAPL water interface (NWI) in the subsurface, and recording the elevation of the NAPL water interface (NWI).

When the NAPL is DNAPL, the determining the transmissivity of the non-aqueous phase liquid (NAPL) may comprise gauging the subsurface through a well to determine an apparent NAPL water interface (NWI) (as DNAPL is generally denser than groundwater), calculating an elevation of the apparent NAPL water interface (NWI) in the subsurface, and recording the elevation of the apparent NAPL water interface (NWI). Also, the method may comprise gauging the subsurface through a well to determine the base of the NAPL in the subsurface and the total depth (TD) of the well, calculating an elevation of the base of the DNAPL in the subsurface, and recording the elevation of the base of the DNAPL and well TD.

In some embodiments, determining the transmissivity by gauging may be performed by means comprising a pressure transducer, an electronic interface probe (EIP), or other means known to one skilled in the art.

In some embodiments, identifying the mobile non-aqueous phase liquid intervals (MNI) may comprise removing an amount of non-aqueous phase liquid (NAPL) from the subsurface through a well, monitoring an apparent drawdown of the non-aqueous phase liquid (NAPL) in the well, monitoring a discharge rate of the non-aqueous phase liquid (NAPL) in the well from an area of the subsurface comprising non-aqueous phase liquid (NAPL) near the well, analyzing a rate of change for the discharge rate, analyzing a rate of change for the drawdown, and determining when the rate of change for the discharge rate and drawdown are substantially zero. In certain embodiments, the amount of non-aqueous phase liquid (NAPL) removed may be substantially all the non-aqueous phase liquid (NAPL) from the well at an equilibrium condition. In some embodiments, the method may further comprise quantifying a hydraulic recoverability of non-aqueous phase liquid (NAPL) in the mobile non-aqueous phase liquid intervals (MNI).

In certain embodiments, the subsurface may comprise a fractured porous media. In some embodiments, the method may further comprise correlating each mobile non-aqueous phase liquid interval (MNI) to a fracture within the fractured porous media. In certain embodiments, the method may further comprise generating a well non-aqueous phase liquid conceptual model (WCM) by comparing the correlation of mobile non-aqueous phase liquid interval (MNI) and the fracture within the fractured porous media to a boring log for the sub surface.

In certain embodiments, the subsurface may comprise a layered arrangement of granular porous media and non-porous media. In some embodiments, the method may further comprise correlating each mobile non-aqueous phase liquid interval (MNI) to a layer of granular porous media. In certain embodiments, the method may further comprise generating a well non-aqueous phase liquid conceptual model (WCM) by comparing the correlation of mobile non-aqueous phase liquid interval (MNI) and the layer of granular porous media to a boring log for the subsurface.

Also disclosed herein are systems for evaluating a distribution and recovery of a non-aqueous phase liquid (NAPL) in a subsurface. In certain embodiments, the system may comprise a first component for determining a transmissivity of a non-aqueous phase liquid (NAPL) in the subsurface. In some embodiments, the system may further comprise a second component for identifying a plurality of mobile non-aqueous phase liquid (NAPL) intervals (MNI) in the subsurface. Each of the embodiments disclosed herein for the methods may be used with the systems.

Methods to Measure NAPL

Thus, disclosed are methods to quantify NAPL in a subsurface (e.g., soil, rock and the like). The methods may be embodied in a variety of ways.

The term 'Coefficient of Transmissibility' (now known as transmissivity) was introduced by Charles V. Theis (Theis, 1935) to express the rate of flow of groundwater through a 1-foot wide strip of aquifer for the full saturated thickness of the aquifer, under a unit hydraulic gradient (e.g., 1 foot per foot or 1 meter per meter). In simpler terms, Theis noted that transmissivity is the average coefficient of permeability (now known as hydraulic conductivity) multiplied by the thickness of the aquifer. Transmissivity and hydraulic conductivity may be used as critical hydraulic parameters for Darcian flow to calculate the groundwater production potential and other performance data for a groundwater well (Freeze and Cherry 1979).

NAPL may be classified as light non-aqueous phase liquid (LNAPL) or dense non-aqueous phase liquid (DNAPL) depending on the density of the NAPL relative to water.

Transmissivity may be used to model the occurrence of LNAPL in homogeneous granular porous media (Lenhard and Parker 1990 and Farr et al. 1990). Multiphase fluid flow equations for LNAPL and groundwater including estimation of LNAPL transmissivity from calibrated LNAPL distribution and recovery models have been developed for granular porous media (Charbeneau 2000, 2007). LNAPL transmissivity may be measured via baildown tests (ASTM E2856 2013).

A numerical method may be applied to measure LNAPL transmissivity from baildown tests Zhu et al. (1993). Lundy and Zimmerman (1996) presented a method to estimate LNAPL transmissivity using the Bouwer and Rice slug test analysis methodology (Bouwer & Rice 1976; Bouwer 1989), and Huntley (2000) described multiple methods by which LNAPL transmissivity may be estimated from LNAPL baildown testing. The Huntley and Lundy/Zimmerman methods were unified by Kirkman (2012) with the development of the "J Ratio" to account for varying rates of groundwater recharge into baildown testing wells using the Bouwer and Rice slug testing methodology. Further refinement and improvement of LNAPL transmissivity estimation via baildown methods, continues through improved filtering of baildown testing data (Hawthorne 2014a), and better understanding of the effects of hydrogeologic conditions on drawdown calculations during baildown testing and the proper formulas for each hydrogeologic condition by which to correctly calculate LNAPL drawdown (Hawthorne 2014b).

Manual skimming testing may also be used to estimate LNAPL transmissivity. Kirkman and Hawthorne (2013). Hawthorne (2013) and Hawthorne and Kirkman (2013) describe the calculation methodology and interpretation of LNAPL transmissivity from total fluids recovery data. ASTM International, Inc. (ASTM 2013) provides methods for the measurement of LNAPL transmissivity via baildown/ slug testing, manual skimming testing, recovery data analysis, and tracer testing methods. Charbeneau et al. (2012) developed a spreadsheet analysis tool (the American Petroleum Institute [API] baildown testing tool) for baildown testing to estimate LNAPL transmissivity under various hydrogeologic conditions. A similar tool has been developed through API for analysis of manual skimming tests as well (Hawthorne et al., in review). However, these methods may not reliably be utilized for subsurfaces other than granular porous media with single mobile NAPL intervals (MNI).

LNAPL transmissivity incorporates LNAPL physical parameters, pore fluid saturation, and LNAPL-water relative permeability as well as aquifer parameters to quantify the hydraulic recoverability of the LNAPL. LNAPL transmissivity may be normalized and therefore meaningful across all sites, and may represent the anticipated recovery rate of LNAPL for a unit LNAPL drawdown (ASTM 2013). A threshold range of 0.1 to 0.8 feet squared per day ($ft^2$/day) (0.009 to 0.074 meters squared per day [$m^2$/day]) may be set for a decision point of LNAPL remediation (Interstate Technology & Regulatory Council, ITRC 2009). As examples, the States of Kansas and Massachusetts have included a threshold of 0.8 $ft^2$/day (0.074 $m^2$/day) to define the limit of practical hydraulic recovery of LNAPL in their regulatory guidance (KDHE 2015, MDEP 2016). According to an informal survey of regulatory agency acceptance and use of LNAPL transmissivity across the United States of America, LNAPL transmissivity has been accepted in some official capacity in at least 35 individual states (Hawthorne et al. 2016).

The presence of NAPL (non-aqueous phase liquid) in the subsurface exhibits complex migration characteristics in three dimensions, with contaminants partitioning into solid, aqueous, and gas phases. This is illustrated in FIG. 1, showing a conceptual site model having various contaminants partitioning into various phases. The distributions of contaminants and NAPL both laterally and vertically can be vitally important. Real-time, direct-sensing investigation techniques, such as TarGOST® (for coal tar DNAPL), UVOST® (for petroleum LNAPL), and membrane-interface probe (MIP, for VOCs) to map contaminant distributions laterally and vertically as a function of geologic and hydrogeologic conditions can be used to perform certain steps of the disclosed methods. When these data are combined with conventional analyses of samples of soils, groundwater, and soil gas, it is possible to develop a complete conceptual site model (CSM) to describe current site conditions. A comprehensive CSM also provides the basis to predict how the site will change over time in response to various remedial measures.

The methods disclosed herein, which in certain embodiments may be referred to as PREDiCT™ (Precision Recoverability Evaluation of DNAPL Coal Tar) may be used to identify the mobile NAPL interval(s) present and their individual DNAPL recovery rates. Many high resolution logging methods do not work in rock strata, but PREDiCT™ can be implemented in any well regardless of lithology screened.

The methods and systems disclosed herein may provide a quantitative evaluation of NAPL vertical distribution and recoverability. In certain embodiments, the methods and systems includes transmissivity testing and high resolution mobile NAPL interval definition that integrates with and enhances conceptual site models (CSM) and can support low threat risk-based closures. Application of the methods and systems of the invention can allow the focused application of resources in the correct manner at the correct 3D location, resulting in reduced costs and maximum return on a recovery investment. For example, in certain embodiments, the methods and systems disclosed herein can be used to define an anticipated maximum flowrate and radius of influence from individual recovery wells to design a remedy as well as to predict the timeframe for recovery to endpoint thresholds. In some instances, unproductive wells can be shut down or not installed in the first place because the feasibility of hydraulic recovery can be determined prior to initiating remediation. The methods and systems disclosed herein may also provide progress metrics throughout remediation by tracking the ongoing remedy during remediation and by gauging if it is time to stop hydraulic recovery.

Figure 2:
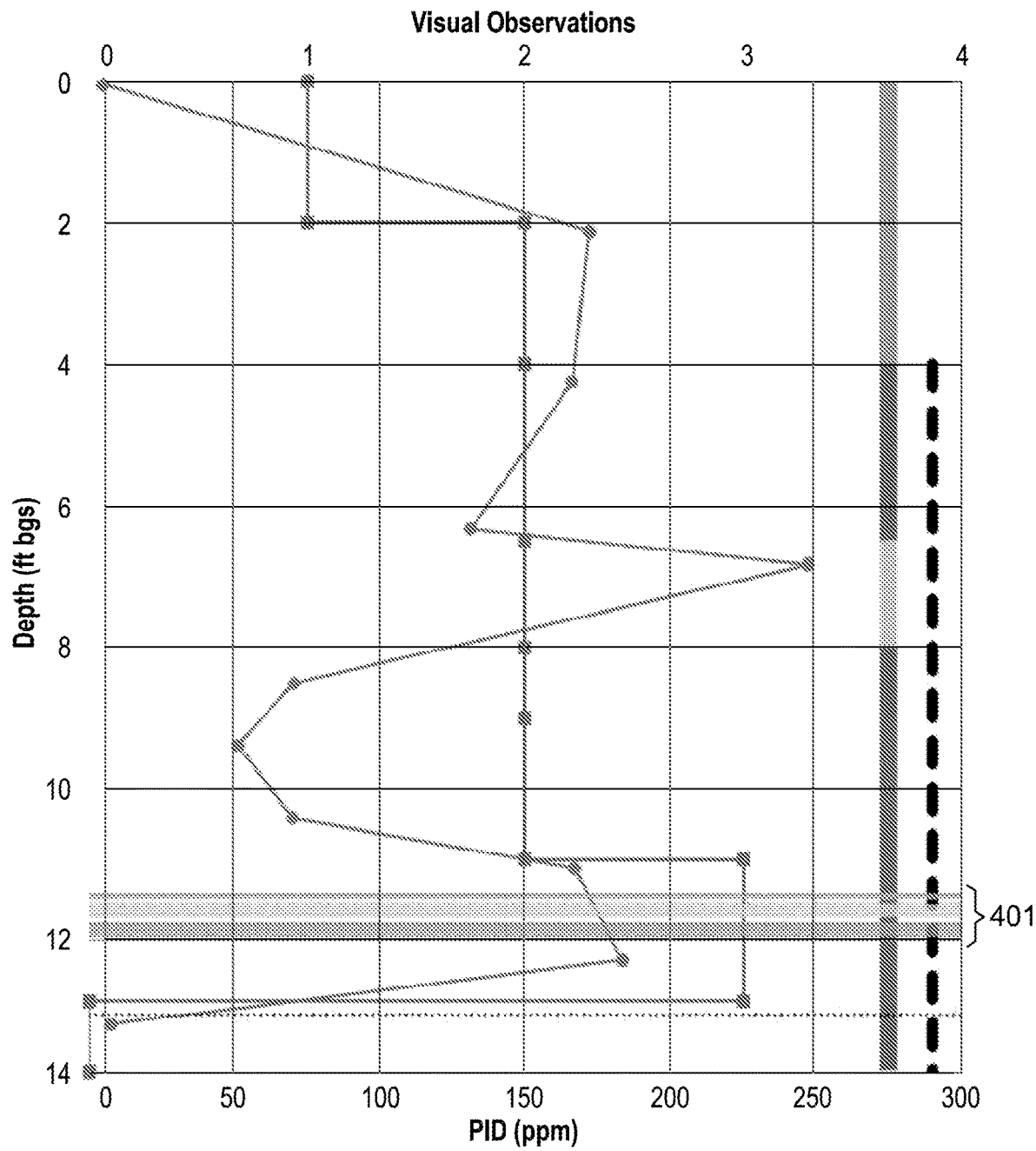
FIG. 2 illustrates a lithologic profile for the well and the NAPL distribution in the soil or rock.

Conceptual models for wells with DNAPL may capture the lithologic profile for the well and the DNAPL distribution in the oil or rock. In certain embodiments, the DNAPL modeled is coal tar. While low and high resolution methods can provide some indication of the presence of DNAPL such as coal tar, such methods cannot accurately predict if the coal tar is mobile or recoverable. Using the methods and systems disclosed herein, the mobile NAPL interval(s) may be identified and their individual recovery rates indicated as shown by the horizontal lines near the bottom of the well as shown in FIG. 2 at feature 401.

Figure 3:
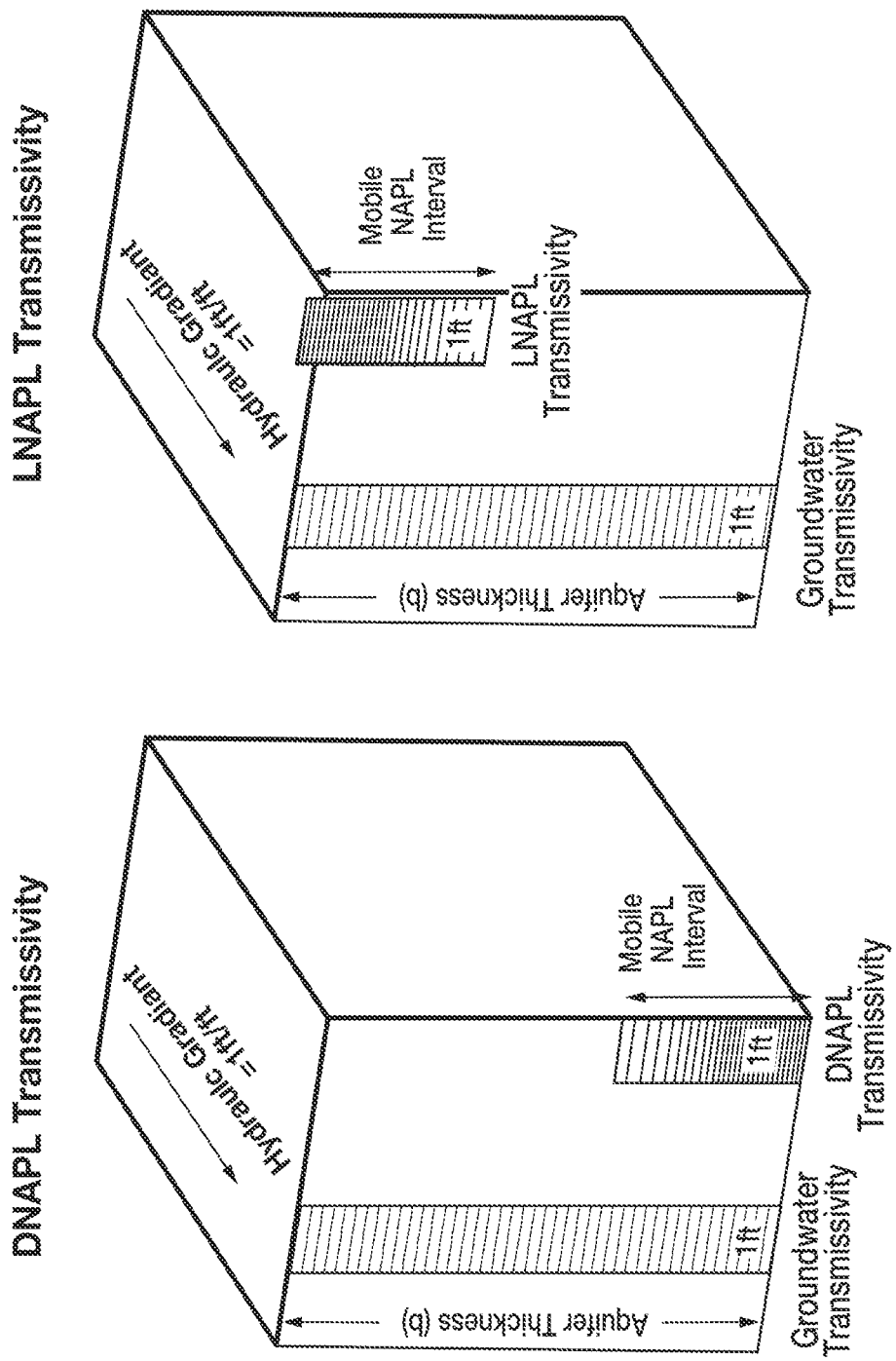
FIG. 3 shows a conceptual drawing of transmissivity for LNAPL and DNAPL.

In certain embodiments, the first step of the method involves testing the transmissivity of the dense non-aqueous phase liquid (DNAPL). FIG. 3 is an illustrative representation of transmissivity and shows the general location of LNAPL and DNAPL within a subsurface. FIG. 3 shows transmissivity of ground water (dark vertical column), LNAPL (strip in the upper block), and DNAPL (strip in the bottom block). Transmissivity is an established universal metric for the recoverability of groundwater from aquifers, essentially measuring the rate at which groundwater can flow through a one-foot wide strip of an aquifer under a unit gradient in a unit amount of time. However, transmissivity is not limited to groundwater; it can be used to measure the flow potential for any liquid in the subsurface that exhibits Darcian flow.

As documented in ASTM E2856, transmissivity may be measured for LNAPL (light non-aqueous phase liquid) via multiple methods and accounts for the different density and viscosity of the LNAPL, as well as the relative permeability resulting from two liquids, groundwater and LNAPL, competing to flow through an aquifer. Although conceptually, transmissivity may also be calculated for DNAPL using many of the same methods identified in ASTM E2856, until now, transmissivity has been extremely difficult to accurately measure for DNAPL. Transmissivity can be applied to DNAPL in an innovative way to quantify DNAPL recovery rates and sustainable production volumes in recovery wells. By using the geometry of the multiple zones underground that contain mobile and recoverable DNAPL along with transmissivity testing, the location and recovery rate of DNAPL around the recovery well can be predicted with a great deal of precision.

In certain embodiments of the disclosed methods, testing of transmissivity is performed using a dual transducer method. A first transducer is placed in the DNAPL and the pressure measurement is recorded and used to calculate the elevation of the DNAPL. Similarly, a second transducer is placed in a water column near the DNAPL and used to calculate the elevation of the water column. The thickness of the DNAPL is determined by comparing the elevation of the DNAPL to the elevation of the water column.

Figure 4:
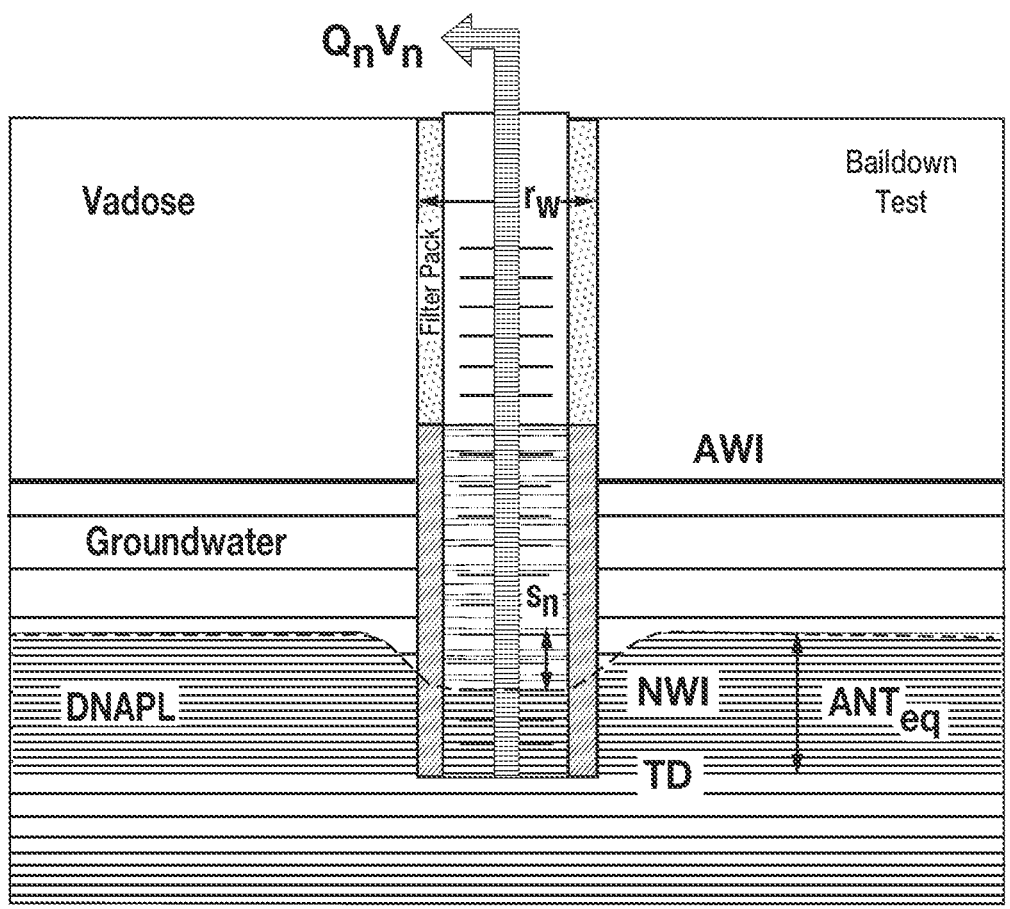
FIG. 4 shows a conceptual drawing of a baildown test for DNAPL.

Specific gravity measurements of the DNAPL and water column can be utilized to determine the high resolution mobile interval definition of the dense non-aqueous phase liquid through an iterative calibration process using baildown testing methods discussed in detail herein. FIG. 4 is a graphical representation of baildown testing. Baildown testing is similar to slug testing for groundwater wells. DNAPL is removed from a well, inducing drawdown in the DNAPL and flow into the well proportional to the DNAPL recoverability in the soil or rock around the well. As the DNAPL recharges into the well, the fluid interface elevations are monitored over time until the DNAPL in the well and formation are at equilibrium. During the iterative calibration process, specific gravity measurements are used to refine the definition of the dense non-aqueous phase liquid.

In many situations, the subsurface is a mixture of different types of geologies. Accurately calculating NAPL transmissivity may require an understanding of the NAPL Conceptual Site Model (CSM) for the site (see e.g., ASTM 2014; ITRC 2009; ITRC 2016). For sites where the NAPL may be within granular porous media, the key parameters from the CSM, with respect to NAPL transmissivity, may be understanding the hydrogeologic condition of the NAPL as either unconfined, confined, or perched; along with the location and thickness of the mobile NAPL interval (MNI) (ITRC 2016; Kirkman et al. 2012).

For example, perched NAPL is mobile NAPL where the downward migration of the NAPL may be limited by pore entry pressure often associated with a lower permeability layer (Hawthorne et al. 2011b; Kirkman et al. 2012; ITRC 2016). For LNAPL, if a well is screened through and below the perched MNI, the well may fill with LNAPL like a sump until the air/NAPL interface (ANI) in the well may be in pressure equilibrium with the top of the MNI. As a result, perched LNAPL is sometimes referred to as a "top down" filling model and can result in exaggerated apparent (i.e., in well) NAPL thickness (ANT) values relative to the MNI. As long as the groundwater elevation remains below the base of the perched MNI, the LNAPL transmissivity may remain constant (unless altered via a new release, migration into or out of the well radius of capture, leakage through the perching layer, or artificial removal).

Confined NAPL is mobile NAPL where the upward migration of the LNAPL may be limited by pore entry pressure limitations that may be associated with a lower permeability layer (Johnson et al. 2010; Hawthorne et al. 2011a; Kirkman et al. 2012; ITRC 2016). For example, for LNAPL, when the potentiometric surface may be above the confining contact, the well may act like a pressure relief valve and LNAPL may rise into the well until it may equalize with atmospheric pressure. As a result, confined LNAPL is sometimes referred to as a "bottom filling" model, and may result in substantially exaggerated ANT values relative to the MNI. As long as the ANI elevation may remain above the base of the confining layer, the LNAPL transmissivity may remain constant (unless altered via a new release, migration into or out of the well radius of capture, leakage through the confining layer, or artificially removed).

Unconfined NAPL is less restricted by capillary pressure effects of low permeability soils, and a portion of the mobile NAPL may fluctuate vertically with the groundwater surface. However, during rising water tables, some portion of the unconfined NAPL may be submerged below the water table, and may result in decreasing NAPL mobile saturations and ANT values in wells. Conversely, during falling water tables, the previously submerged NAPL may be released, increasing the NAPL saturation and ANT (CLAIRE 2014; ITRC 2016). NAPL transmissivity may similarly vary with the fluctuating water table and saturations.

For unconfined NAPL at equilibrium in a single MNI, the ANT measured in the well may be a reasonable approximation for the MNI under the potentiometric surface conditions where it is measured. For confined and perched NAPL, the ANT in the well may be greatly exaggerated in comparison to the MNI. In all cases, understanding the thickness of the MNI and the equilibrium elevations of the ANI and calculated groundwater surface (CGWS) under the conditions at the time of a NAPL transmissivity test may be critical to accurate calculation of the NAPL drawdown.

Figure 5:
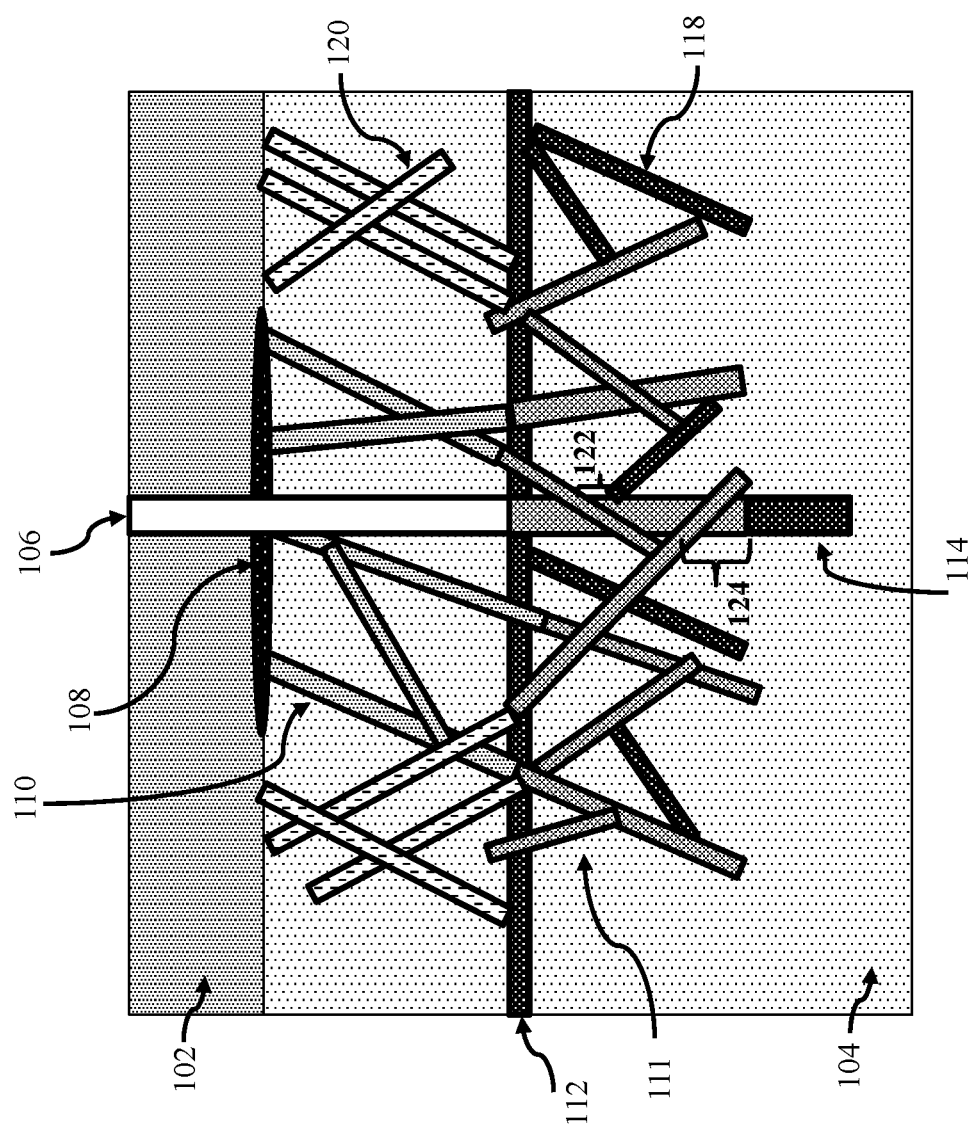
FIG. 5 shows a conceptual diagram of light non-aqueous phase liquid (LNAPL) in a fractured subsurface.

In the case of fractured media, complex migration pathways may be potentially present. One conceptualization of LNAPL in a fractured environment is shown in FIG. 5, a conceptual diagram of LNAPL in fractured granite 104 or other igneous rock, where water is shown in the darkest shading (112, 114, and 118) between a porous media 102 and fractured media 104. Note the complex migration pathways and pattern of fractures with mobile LNAPL 110 and without mobile LNAPL 120/118 underneath the source area 108, and the submergence of LNAPL in vertical to sub-vertical fractures 111. Mobile LNAPL may appear only in wells that encounter one or more of the fractures containing mobile LNAPL. As shown, a well 106 that penetrates more than one fracture with mobile LNAPL may exhibit more than one MNI (122 and 124) as each fracture represents an individual MNI in communication with that well.

The mobile LNAPL may be present in individual fractures, and may or may not be distributed meaningfully within the primary porosity of the fractured media. Depending on the fracture orientation and LNAPL head pressure in the fractures, mobile LNAPL may be present submerged to a substantial depth beneath the water table as detailed in CLAIRE (2014) and Johnson et al. (2010). However, it will only appear in wells if the individual fractures intersect the well screen and pressures and if the connectivities within the fracture system allow flow of LNAPL into the well (ITRC 2016; Adamski et al. 2005). As such, multiple MNIs may be commonly anticipated where each MNI represents an individual fracture with mobile LNAPL.

Figure 6:
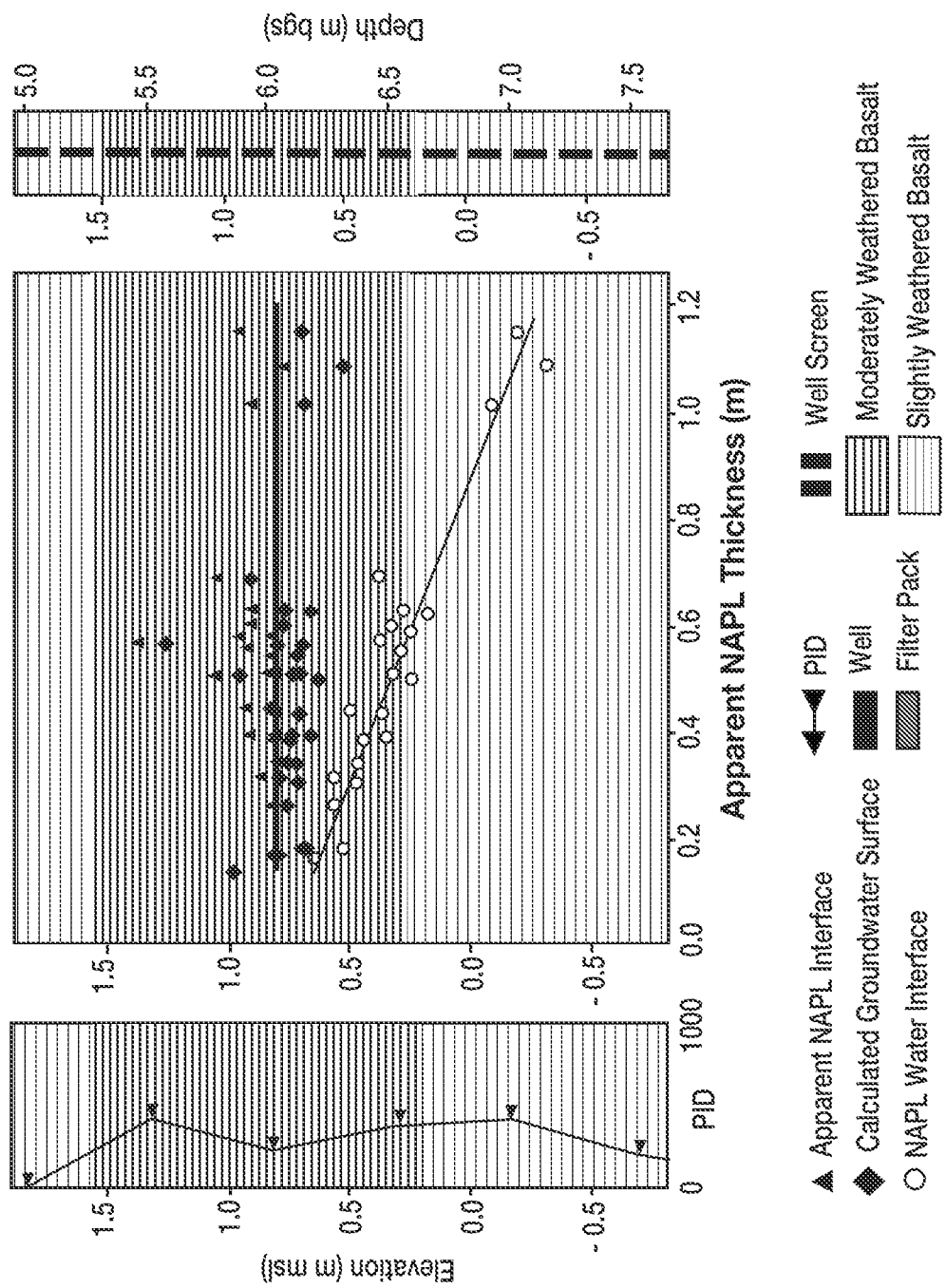
FIG. 6 is an annotated diagnostic gauge plot (DGP) for a recovery well.

A diagnostic gauge plot (DGP) may be used to identify the hydrogeologic condition of the NAPL. An example DGP for LNAPL from a test well is shown in FIG. 6. The details of constructing and interpreting DGPs are presented in Kirkman et al. (2012). In FIG. 6, the geology, PID response, and well construction data shown is from Well B discussed in the Examples. The fluid gauging data represents equilibrium data from a pre-existing monitoring well approximately 5 meters from Well B. The well hydraulics are consistent with a "top down" filling model where the ANI is in pressure equilibrium with the upper-most MNI, similar to perched LNAPL in granular porous media.

The Darcian flow equations, developed for granular porous media, may be utilized to interpret the NAPL behavior within fractured porous media under low flowrate scenarios (Reynold's number less than approximately 1) (Quinn et al. 2011). However, under higher flowrate scenarios, alternate calculation methodologies may be required.

The discharge versus drawdown plot (DvD) may be a key tool presented to identify the location and thickness of fractures with mobile NAPL as well as their associated NAPL discharge values. (Kirkman et al. 2012; Hawthorne and Kirkman 2011). This data may be utilized to calculate the NAPL transmissivity for each individual MNI and for the well in the aggregate.

The data may also be integrated into the well NAPL conceptual model (WLCM) both to provide additional detail towards understanding the site as well as to utilize other field methodologies to verify the test results.

To generate a DvD, NAPL may be evacuated from the well. For example, for LNAPL, the fluid interfaces (ANI and NAPL/water interface (NWI)) may be monitored until the LNAPL returns to equilibrium. For DNAPL, the fluid interfaces at NWI (top) and bottom (TD) of the NAPL in the well are monitors to determine the apparent NAPL thickness (ANT). The drawdown for LNAPL is then defined as the ANI at equilibrium, $ANI_{eq}$ minus the ANI at any time point, i.e., $ANI_{eq}-ANI(t_1)$. The drawdown for DNAPL is then defined as the NWI at equilibrium, $NWI_{eq}$ minus the NWI at any time point, i.e., $NWI_{eq}-NWI_{t1}$. For both LNAPL and DNAPL, the discharge is then the change of ANT at a time point multiplied by the well area, i.e., $\Delta ANT(t_1) \times$ Well area.

Figure 7:
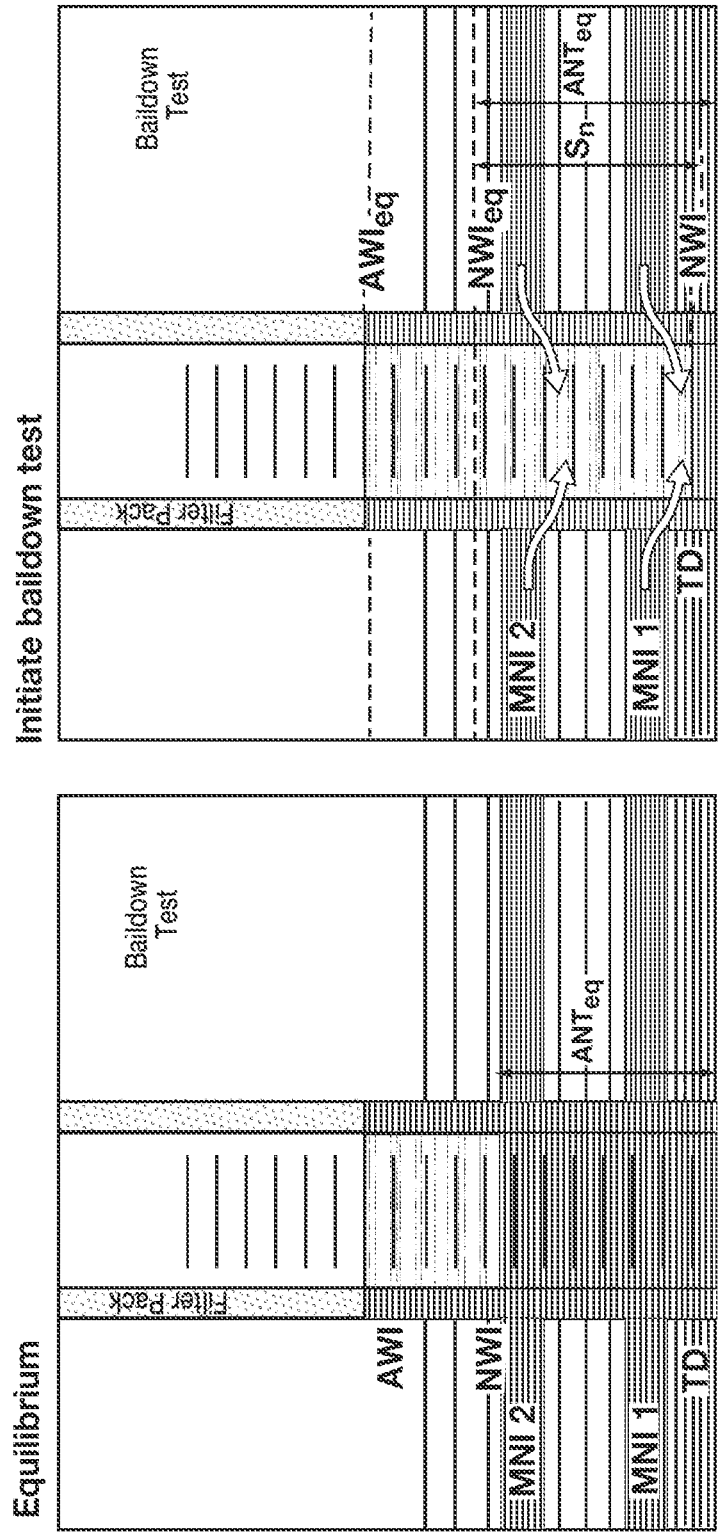
FIG. 7 shows a conceptual drawing of a DvD plot interpretation for the first phase of DNAPL baildown.
Figure 8:
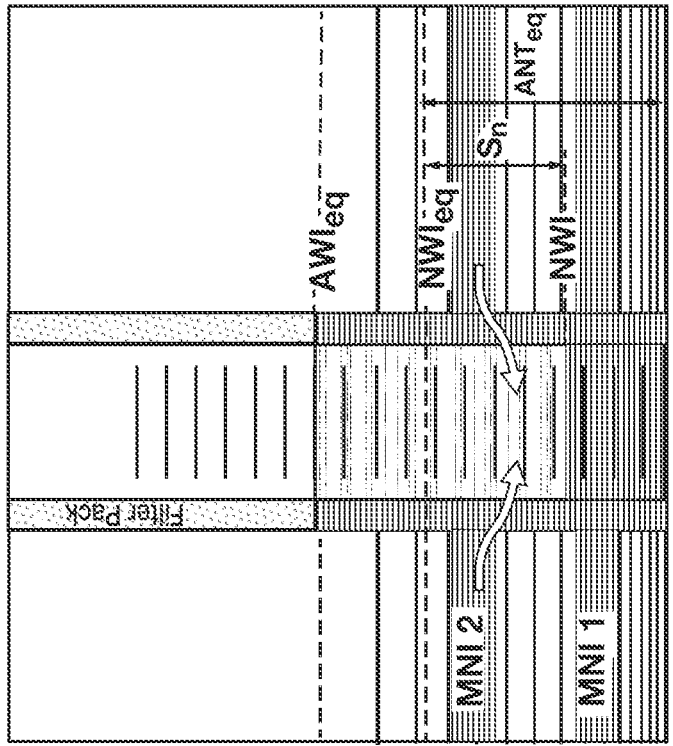
FIG. 8 shows a conceptual drawing of a DvD plot interpretation for the second phase of DNAPL baildown.
Figure 8:
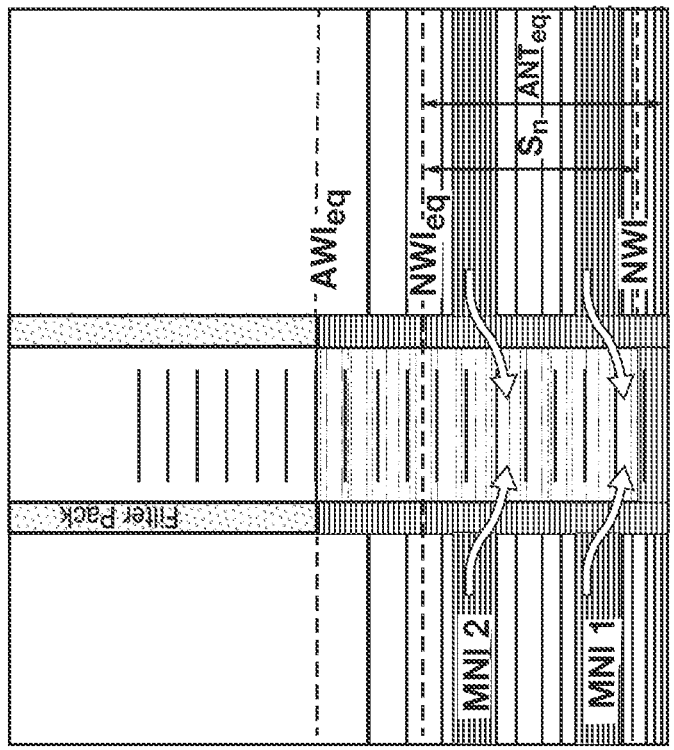

This procedure may be the primary step in conducting a baildown test to estimate LNAPL transmissivity. During baildown testing, NAPL is removed from the well and the fluid elevations within the well are monitored over time until the NAPL in the well has returned to equilibrium levels with NAPL in the formation. An example of baildown testing for DNAPL is shown in FIG. 4, where NAPL drawdown, $s_n$, is monitored until both the NAPL drawdown, $s_n$, and the apparent NAPL thickness, ANT, return to the equilibrium level, $ANT_{eq}$. FIG. 7 shows the well at equilibrium state and at the initiation of baildown testing, where the NAPL within the well is removed. When the NAPL is removed, the distance between the top and bottom interfaces of the NAPL, drawdown or $s_n$, may be at its maximum. Once the amount of NAPL in the well at equilibrium is removed, the mobile NAPL intervals (MNI) that intersect the well may begin recharging the well. During the recharge stage, the drawdown may decrease as the top interface approaches equilibrium level. As the MNI recharge the well, the lower-most MNI may reach pressure equalization and no longer contribute to the thickness of the NAPL in the well, shown in FIG. 8. The MNI above may continue to flow into the well and recharge the well until the NAPL level equalizes with the MNI. In embodiments with DNAPL, the top interface is the NAPL water interface, NWI. In embodiments with LNAPL, the top interface is the air NAPL interface, ANI.

Monitoring the recharge to equilibrium to create a DvD may also be performed after shutting down a recovery system or conducting one of the other short-term NAPL transmissivity test methodologies (e.g., manual skimming test, ratio test) (ASTM 2013).

NAPL drawdown may require different calculation methods for unconfined, confined, and perched NAPL. The drawdown used to create a DvD may be referred to as apparent NAPL drawdown. The apparent NAPL drawdown may be estimated throughout the test as the difference between the equilibrium ANI and the ANI as it recovers to equilibrium (ASTM 2013). Initiating the test with the NAPL at equilibrium may be preferred. In a fractured rock environment, it may be critical to continue monitoring the fluid interfaces until the NAPL returns to equilibrium to ensure that all individual fractures with mobile NAPL are identified. Equilibrium may be identified by (1) ANI (LNAPL) or NWI (DNAPL) returns to its original, equilibrium elevation, (2) the ANT is stable with time on a log-scale, and (3) the drawdown and discharge rate are both zero.

Fluid interfaces may be manually gauged and/or monitored using pressure transducers (ASTM 2013). In a fractured rock environment, it may be preferential to utilize pressure transducers in order to improve the resolution and precision of the data set, and ensure that all individual fractures with mobile LNAPL may be identified. In some cases, the changes in drainage/recovery response may be too quick for manual measure. Detailed procedures for calculating the ANI and NWI based on pressure transducer data are described in ASTM E2856 (2013).

As noted above, the NAPL discharge rate may be calculated based on the change in NAPL volume in the well for a given change in ANT over a given time interval (ASTM 2013). This calculation requires the casing radius, the borehole radius, the screen length and location, and the specific yield of LNAPL in the filterpack as well as the elapsed time between readings. It may be preferential to identify if the borehole volume or the casing volume is appropriate to use, and if this changes as the test progresses.

Fluid monitoring data may be collected using the top of the well casing as a datum. However, borehole data (e.g., logs, core photography) may be collected using the ground surface as the datum. Accurate data of the relative elevation of each may be required in order to use the DvD to correlate the location of the MNIs to individual fractures from the borehole data.

Figure 9:
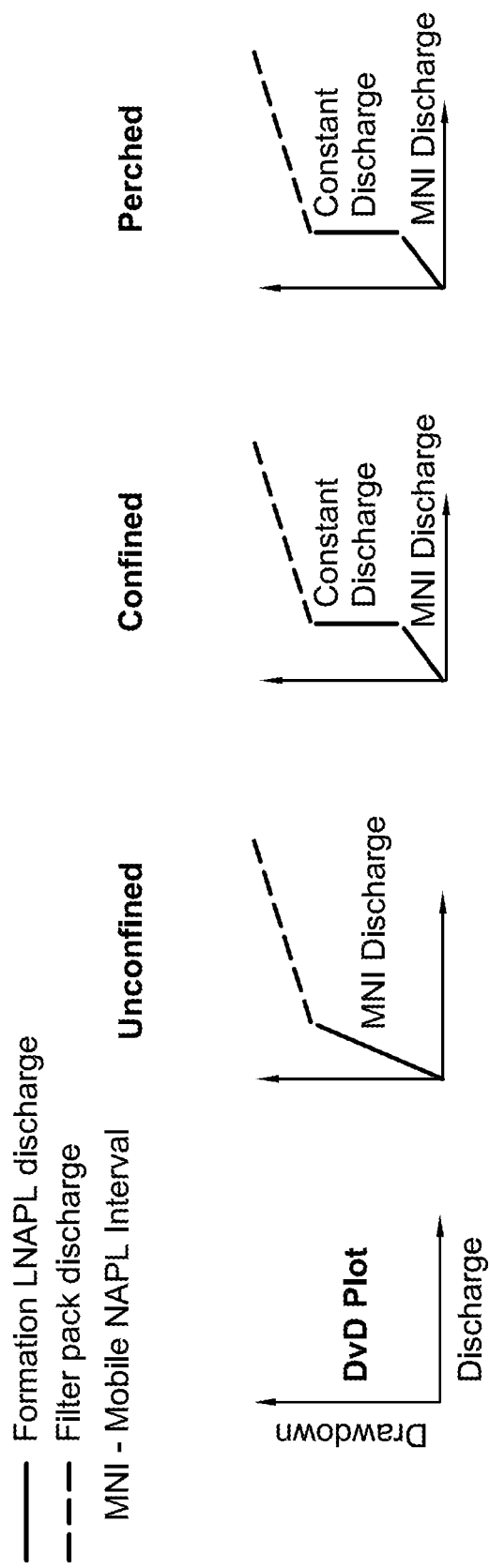
FIG. 9 shows conceptualized discharge versus drawdown (DvD) plots for LNAPL recharging into a well under unconfined, confined, and perched conditions.
Figure 9:
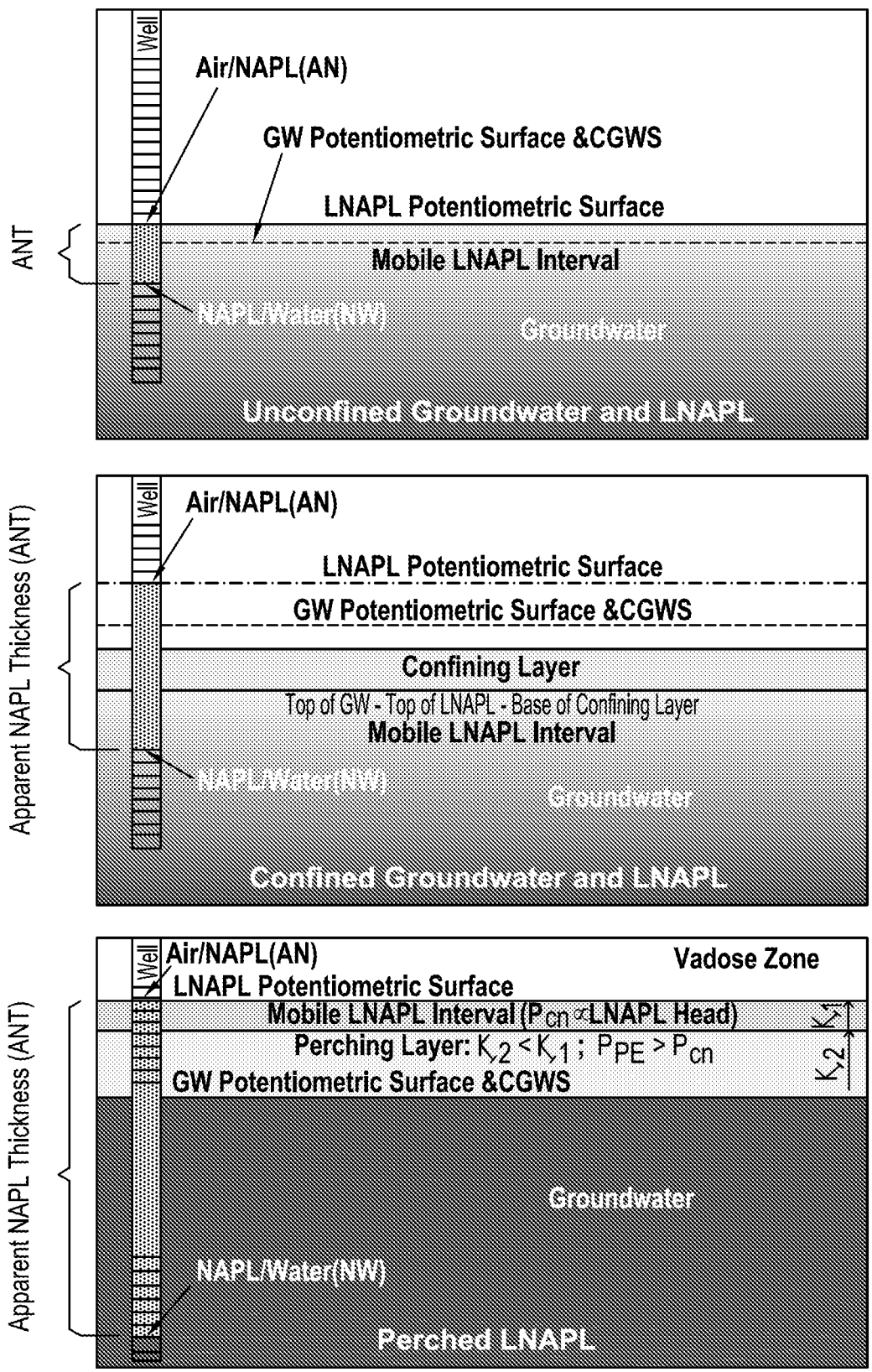

As shown in FIG. 9, the DvD may be generated by plotting the NAPL discharge rate on the x-axis and the NAPL drawdown on the y-axis. The conceptualized DvD plot at the bottom of FIG. 9 shows LNAPL recharging into a well from a single MNI under unconfined, confined, and perched conditions. For the DvD plots, recharge begins in the upper right portion of the graph and proceeds to completion of the recharge dataset at the graph origin. NAPL drawdown and discharge may be initially large, gradually decrease as the test proceeds, and may be zero when equilibrium is achieved. Periods of decreasing drawdown with constant discharge may be characteristic of perched or confined NAPL where the NAPL in the well may be above or below MNI. Under all hydrogeological conditions, the sloping line at the end of the test represent the MNI. The thickness of the MNI may be determined from the change in drawdown from the beginning to the end of the sloped line. The vertical location of the MNI can also be determined from the drawdown range.

A spreadsheet tool, developed by Charbeneau et al. (2012), (the API baildown testing tool) may be utilized to perform the required discharge and drawdown calculations according to the ASTM E2856 (2013) methodology and generate the DvD for interpretation.

In granular porous media, a single MNI may be common, though multiple MNIs can occur in interbedded/stratified lithologies. If the NAPL is under unconfined conditions, the DvD may illustrate a linear trend toward the origin (zero discharge for zero drawdown). Similar to fractured media, if the NAPL is under confined or perched conditions, the DvD may exhibit a period of constant discharge followed by a linear trend toward the origin at the end of the test as described in Kirkman et al. (2012) and Reyenga and Hawthorne (2015). Conceptualized DvDs for unconfined, confined, and perched LNAPL are shown in FIG. 9.

For example, where LNAPL is under perched conditions, the MNI may be stable and located above a low permeability layer. When the LNAPL is evacuated from the well, the fluid interfaces may drop below the perching contact. The well may act as a sump filling with LNAPL at a constant rate. When the ANI reaches the perching contact (the bottom of the MNI), the LNAPL in the well may be in communication with the LNAPL in the formation. At this point the well may respond analogously to unconfined LNAPL where the LNAPL discharge rate decreases linearly as the ANI moves up through the MNI. The thickness of the MNI may be identified as the difference between the ANI at the perching contact and at equilibrium, or the thickness of the linearly decreasing portion of the DvD (Reyenga and Hawthorne 2015).

Under confined conditions, the MNI may be stable and located below a low permeability layer. In this case the well may act as a pressure relief valve, where the fluid in the well rises above the confining contact due to the confining pressure. Thus when the NAPL is evacuated from the well under confined conditions, the NWI may rise above the confining contact. The NAPL may come into the well at a constant rate from below until the NWI reaches the confining contact. At this point the well may respond analogously to unconfined NAPL where the NAPL discharge rate decreases linearly as the NWI continues to move down through the MNI. The thickness of the MNI can be identified as the difference between the NWI at the confining contact and at equilibrium, or the thickness of the linearly decreasing portion of the DvD (Reyenga and Hawthorne 2015).

Fractured media may be inherently more complex to interpret because the NAPL may be isolated into individual fractures rather than well distributed through a porous media. However, the same basic methodology used for confined and perched NAPL can be utilized to identify the location and thickness of the fractures with mobile NAPL from a DvD.

After the NAPL is removed from the well, a constant discharge rate may be exhibited when the NAPL in the well is between fractures. The NAPL discharge rate may decrease linearly when the appropriate fluid interface, depending on NAPL type and hydrogeologic condition (ANI for LNAPL or NWI for DNAPL) moves through a fracture (an MNI). A linear decrease may be consistent with Darcian flow, and may be anticipated for the relatively low flowrates that occur with LNAPL passively recharging into the well. This process may be repeated for each MNI. The number of MNIs may be identified based on the number of linearly decreasing discharge periods identified. The thickness of each MNI may be identified based on the change in drawdown across the MNI (the thickness associated with the linearly decreasing portion of the curve). A conceptualization of this process is illustrated in FIG. 10.

Figure 10:
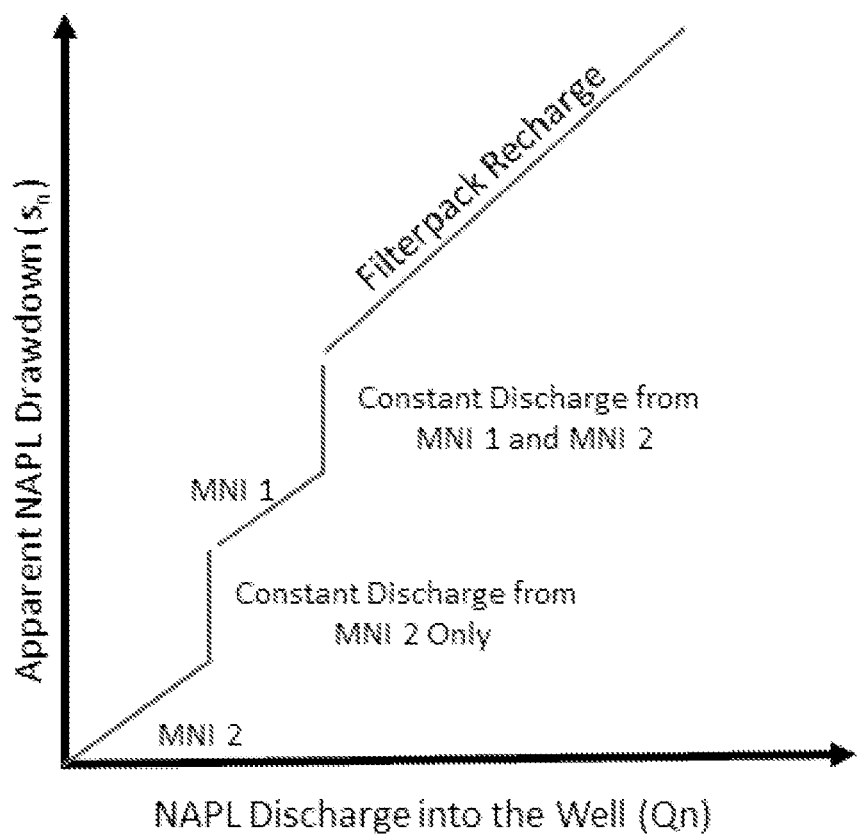
FIG. 10 shows conceptualized DvD plot into a well screened across multiple MNIs.

FIG. 10 shows a conceptualized DvD plot for LNAPL recharging into a well screened across multiple MNIs separated by low permeability zones after the LNAPL was removed for a baildown test. Recharge begins in the upper right portion of the graph and proceeds to completion of the recharge dataset at the graph origin in the lower left because as LNAPL recharges into the well, both the discharge and the drawdown gradually return to zero (equilibrium) values. Vertical lines represent periods of constant discharge in between MNIs. Sloping lines connecting the constant discharge segments represent individual MNIs. After discharge due to filterpack recharge, the right-most constant discharge represents the maximum formation LNAPL discharge observed, which is the total discharge from MNI 1 and MNI 2. The left-most constant discharge represents the maximum discharge for MNI 2 only. The maximum discharge for MNI 1 can be obtained by subtracting the MNI 2 discharge from the total discharge. The thickness of each MNI is determined from the change in drawdown from the beginning to the end of each MNI sloping discharge line. The vertical location of each MNI can also be determined from this drawdown range.

As shown in FIG. 10, NAPL discharge is plotted on the x-axis and apparent NAPL drawdown on the y-axis. The beginning of the test is characterized by large drawdown and large discharge. As the test progresses in time, the drawdown and discharge decrease, and the test is concluded when both are zero. The beginning of the test frequently exhibits filter pack recharge (initial sloping line on the upper right side of FIG. 10). Filter pack recharge is a relatively high discharge rate that represents LNAPL that was not evacuated from the borehole when the test was initiated, and that can drain from the filter pack. This data is not representative of the LNAPL mobility in the formation, and should not be interpreted.

Each MNI may be identified based on the occurrence of constant discharge periods and intervening linearly decreasing discharge periods. The first MNI encountered may include the constant discharge rate from all MNIs (MNI 1 and 2 in FIG. 10). The first linearly decreasing segment on the DvD (shown immediately left of filterpack charge) represents the first MNI. The next constant discharge period may include the constant discharge rate from all MNIs, excluding MNI 1. In the conceptualization there are only two MNIs present, so this constant discharge period represents MNI 2 only. The next linearly decreasing segment on the DvD (far left constant discharge) also represents MNI 2. The linearly decreasing segment on the DvD for the last MNI may be a straight line to the origin (zero discharge, zero drawdown) if the LNAPL recharges to the initial equilibrium conditions at the start of the test.

The discharge rate for each MNI may be calculated by adjusting the raw constant discharge rates observed to isolate each individual MNI. In the conceptualization, MNI 2 is the final MNI. Therefore, the raw discharge rate for MNI 2 may represent its actual discharge rate. The raw discharge rate for MNI 1 may represent the discharge rate from MNI 1 and MNI 2. The actual discharge rate for MNI 1 must be adjusted by removing the portion associated with MNI 2. Continued monitoring recharge in the well until the NAPL returns to equilibrium conditions may be key for a fractured environment, with multiple MNIs. If the monitoring is suspended prematurely, the discharge rates for each individual MNI may not be adjusted accurately and the drawdown may not be accurately identified for subsequent MNI.

Each constant discharge period represents the maximum discharge rate that can be extracted based on exerting drawdown on the NAPL alone (without additional drawdown due to sustained water or vacuum enhancement for example). Therefore, NAPL transmissivity for each MNI and for the well in the aggregate can be estimated directly based on the data gathered in the DvD using the skimming equation as (ASTM 2013):

$$T_n = \frac{Q_n \ln\left(\frac{R_{oi}}{r_w}\right)}{2\pi s_n} \quad \text{(EQ 1)}$$

where:
$T_n$=LNAPL transmissivity ($L^2/\Theta$)
$Q_n$=LNAPL constant discharge rate ($L^3/\Theta$)
$R_{oi}$=radius of influence (L)
$r_w$=effective well radius (L)
$s_n$=LNAPL drawdown (L)

Note: the value of the term $\ln(R_{oi}/r_w)$ can be assumed to equal 4.6 with the introduction of little additional error (ASTM 2013).

For example, the LNAPL constant discharge rate(s) may be estimated based on the DvD as previously described. The thicknesses of the MNIs may be utilized to calculate the LNAPL drawdown associated with each discharge rate. During the constant discharge periods, the maximum achievable skimming drawdown based on the hydrogeologic condition of the LNAPL is utilized. It is calculated as (ASTM 2013):

$$\text{Unconfirmed } LNAPL: \quad s_n = (1 - \rho_r) b_{mni} \quad \text{(EQ 2)}$$

$$\text{Perched } LNAPL: \quad s_n = b_{mni} \quad \text{(EQ 3)}$$

$$\text{Confined } LNAPL: \quad s_n = b_{mni} \frac{1 - \rho_r}{\rho_r} \quad \text{(EQ 4)}$$

where:
$s_n$=LNAPL drawdown (L)
$\rho_r$=ratio of LNAPL to groundwater densities (dimensionless)
$b_{mni}$=the thickness of the MNI (L)

For calculations of LNAPL transmissivity in fractured rock, LNAPL recharge may be monitored until equilibrium which may be identified by: (1) the ANI returns to its equilibrium elevation, (2) the ANT is stable with time on a log-scale, and/or (3) the drawdown and discharge rate are both zero. This step may allow for identification of the location and thickness of every MNI across the LNAPL wetted screen length as well as accurate calculation of the constant discharge rate attributed to each.

Fluid elevations may be measured using interface probes. Since the MNIs can be attributed to individual fractures (millimeter scale), it may be preferred to utilize pressure transducers to improve the accuracy and precision of the measurements as well as to obtain accurate survey data to correlate gauging data to the boring or rock log. If this methodology is implemented, it may be preferred to collect LNAPL density data for individual test wells to improve the accuracy of the calculations.

Systems for Measuring NAPL

Also disclosed herein are systems for evaluating a distribution and recovery of a non-aqueous phase liquid (NAPL) in a subsurface. In certain embodiments, the system may comprise a first component for determining a transmissivity of a non-aqueous phase liquid (NAPL) in the subsurface. In some embodiments, the system may further comprise a second component for identifying a plurality of mobile non-aqueous phase liquid (NAPL) intervals (MNI) in the subsurface. In some embodiments, the system may comprise a computing device, and a sensor. In some embodiments, the system may further comprise one or more networks. Each of the embodiments disclosed herein for the methods may be used with the systems.

Figure 11:
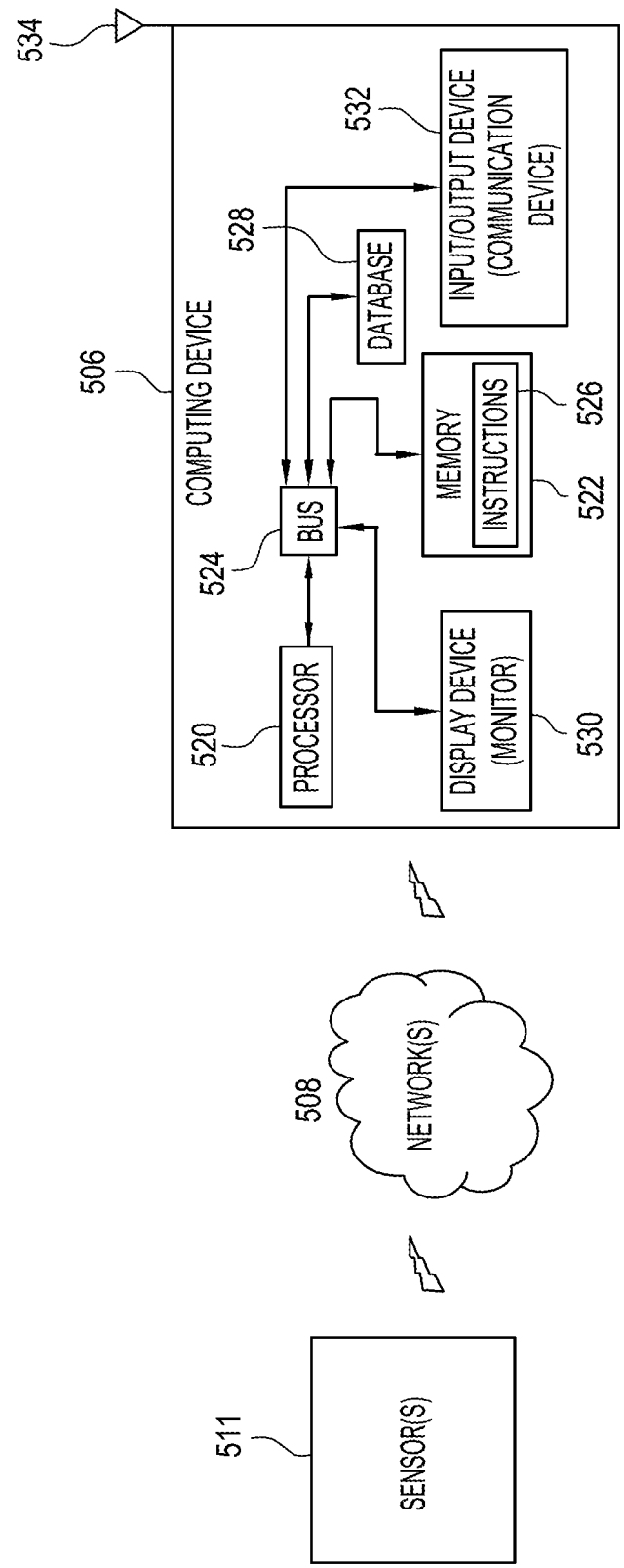
FIG. 11 shows as system for determining the distribution and recoverability of non-aqueous phase liquids

A schematic of the system is shown in FIG. 11. In some embodiments, each of the computing devices 506 can include one or more components for acquiring, processing, and analyzing data. For example, each computing device 506 can include a processor 520, a bus 524, and a memory 522. Each processor 520 can execute one or more operations for operating the computing devices 506. The processors 520 can execute instructions 526 stored in the memory 522 to perform the operations. Non-limiting examples of the processor 520 include a Field-Programmable Gate Array ("FPGA"), an application-specific integrated circuit ("ASIC"), a microprocessor, etc.

Each processor 520 can be communicatively coupled to the memory 522 via the bus 524. Each memory 522 may include any type of memory device that retains stored information when powered off. Non-limiting examples of the memory 522 include electrically erasable and programmable read-only memory ("EEPROM"), flash memory, or any other type of non-volatile memory. In some examples, at least some of the memory 522 can include a computer-readable medium from which the processor 520 can read instructions 526. The computer-readable medium can include electronic, optical, magnetic, or other storage devices capable of providing the processor 520 with computer-readable instructions 526 or other program code. Non-limiting examples of a computer readable-medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C #, etc.

In some examples, each computing device 506 can include input/output interface components (e.g., a display device 530 and a communication device 532). The computing device 506 can also include other input/output interface components such as a database 528, a keyboard, a touch-sensitive surface, a mouse and additional storage. The database 528 of each computing device 506 can include various types of data.

Each computing device 506 can transmit or receive data via a communication device 532. In some examples, the communication device 532 can represent one or more of any components that facilitate a network connection. In some examples, the communication device 532 may be wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In another example, the communication device 532 can be wired and can include interfaces such as Ethernet, USB, IEEE 1394, or a fiber optic interface. Each computing device 506 can transmit or receive data via the communication device 532. In the example shown in FIG. 5, the computing devices 506 can transmit and receive data via a wireless interface. In other examples, the computing devices 506 can transmit and receive data via a wired interface.

The database 528 can include one or more databases that store data to be accessed or processed by any device in the exemplary environment (e.g., the computing devices 506 or any other device that can be in the exemplary environment). In some examples, the database 528 can store a variety of different types of data organized in a variety of different ways and from a variety of different sources. The database 528 may also store data that has been processed by one or more devices in the exemplary environment (e.g., data that has been processed by computing devices 528).

The sensor 511 can be any device or component for detecting an elevation or pressure of NAPL or an apparent NAPL water interface (NWI). In some examples, the sensor 511 can be a pressure transducer or electronic interface probe. In some examples, the sensor 511 can communicate with the computing device 506. For instance, the sensor 511 can transmit data detecting an elevation or pressure of NAPL indicating an apparent NAPL water interface (NWI) to the computing device 506. In other instances, the sensor 511 can transmit data detecting specific gravity of the NAPL.

Communication within the exemplary environment may occur on, or be facilitated by, the network 508, which includes one or more networks or uses one or more communications platforms or technologies suitable for transmitting data or communication signals. For example, the computing devices 506 and the database 528 can communicate (e.g., transmit or receive data) with each other via the network 508. In some examples, the exemplary environment can include one or more of a variety of different types of networks, including a wireless network, a wired network, or a combination of a wired and wireless network.

In some examples, the memory 522 of each computing device 506 can include instructions 526 for causing the computing device 506 to determine the transmissivity, distribution, and recoverability of NAPL. For example, the computing device 506 can receive data from the sensor 511 indicating elevation or pressure of NAPL or in other instances specific gravity of the NAPL. In this example, the computing device 506 can determine or generate a report determining the transmissivity, distribution and recoverability of the NAPL based on the data it received from the sensor 511. The computing device 506 can determine or generate a well conceptual model for the subject well of the sensor 511.

Example 1

LNAPL transmissivity was estimated via a baildown test in a fractured rock environment in wells at a site located in southern Australia. Fluid elevations in this study were measured using interface probes.

The site geology was a low permeability clay to a depth of about 4 meters overlying basalt. The upper approximately 1 meter of basalt was a low permeability massive basalt under which is fractured basalt of varying permeability. Groundwater was approximately 5 meters below ground surface within the basalt and is alternatively confined and unconfined based on the depth of the fractured and low permeability basalt sections, respectively. Sections of extremely weathered basalt throughout the area may provide preferential pathways for groundwater and LNAPL migration.

The LNAPL source was understood to be from an above ground storage tank release of naphtha in 2004. The release had been suspended, and no additional mass was entering the system. The overall extent of the LNAPL body was understood to be stable based on the occurrence of LNAPL in wells, but the potential for hydraulic recovery of LNAPL was not well understood.

Historic gauging data of LNAPL in equilibrium was reviewed to identify the hydrogeologic condition of the LNAPL. The results were predominantly consistent with perched LNAPL where the ANI is stable under fluctuating groundwater conditions as shown in FIG. 6. However, some results were consistent with unconfined LNAPL. This result is not atypical of a site with a complex geology, and the hydrogeologic condition of the LNAPL should be identified in each well prior to analysis.

Baildown tests were completed in a total of fourteen wells. The wells were selected for presentation based on a variety of criteria. The pre-test, equilibrium ANT was greater than the minimum thickness of 0.5 foot (0.15 meter) recommended in ASTM E2856 (ASTM 2013). Data for the fluid elevations was collected at a sufficient resolution to identify individual constant discharge periods and MNIs on the DvD, and for a sufficient time period that the LNAPL returned to equilibrium.

The well geometry was available including the well construction (casing radius, borehole radius, screen elevations, etc.) as well as accurate survey data of both the top of casing elevation and the ground surface elevation.

Detailed descriptive lithologies for the well boreholes were also available. The boring logs include detailed descriptions of the degree of weathering as well as identification of the depth and characteristics of individual fractures. Borehole photography was captured for the entire screen length to aid in defining the fracture depths. The LNAPL distribution was also semi-quantitatively assessed based on photoionization detector (PID) concentrations identified on the boring logs.

The test wells were newly installed, so no historical equilibrium gauging data was identified. The closest existing monitoring well (approximately 2 meters from Well A and 5 meters from Well B) had LNAPL exhibiting perched behavior as shown in FIG. 6. Therefore, the LNAPL in the test wells were assumed to respond consistent with perched LNAPL.

The primary criterion for selection was monitoring the fluid elevations until they returned to equilibrium. This is a critical step to ensuring that all MNIs are identified as well as accurate calculation of the discharge rate associated with each MNI. Only 2 of the 14 wells were gauged back to equilibrium, and the results of those 2 wells are presented herein.

The wells were gauged prior to the test using an interface probe. LNAPL was evacuated from the wells with a peristaltic pump, and the recovery of water was minimized. The fluid interfaces were monitored using an interface probe at least every minute for the entire test (approximately 30 minutes).

Figure 12:
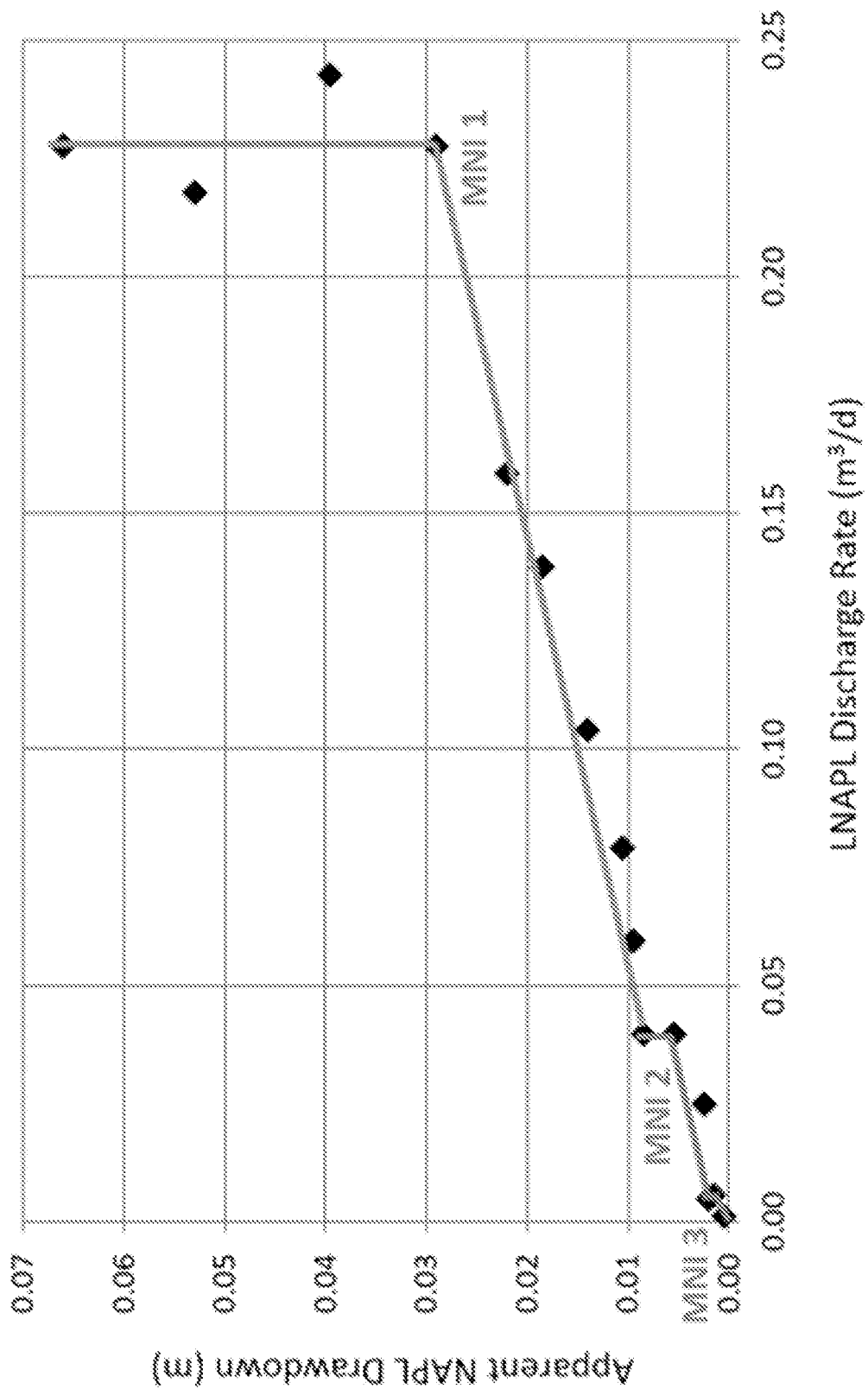
FIG. 12 shows a DvD plot for LNAPL recharging into example Well A.
Figure 13:
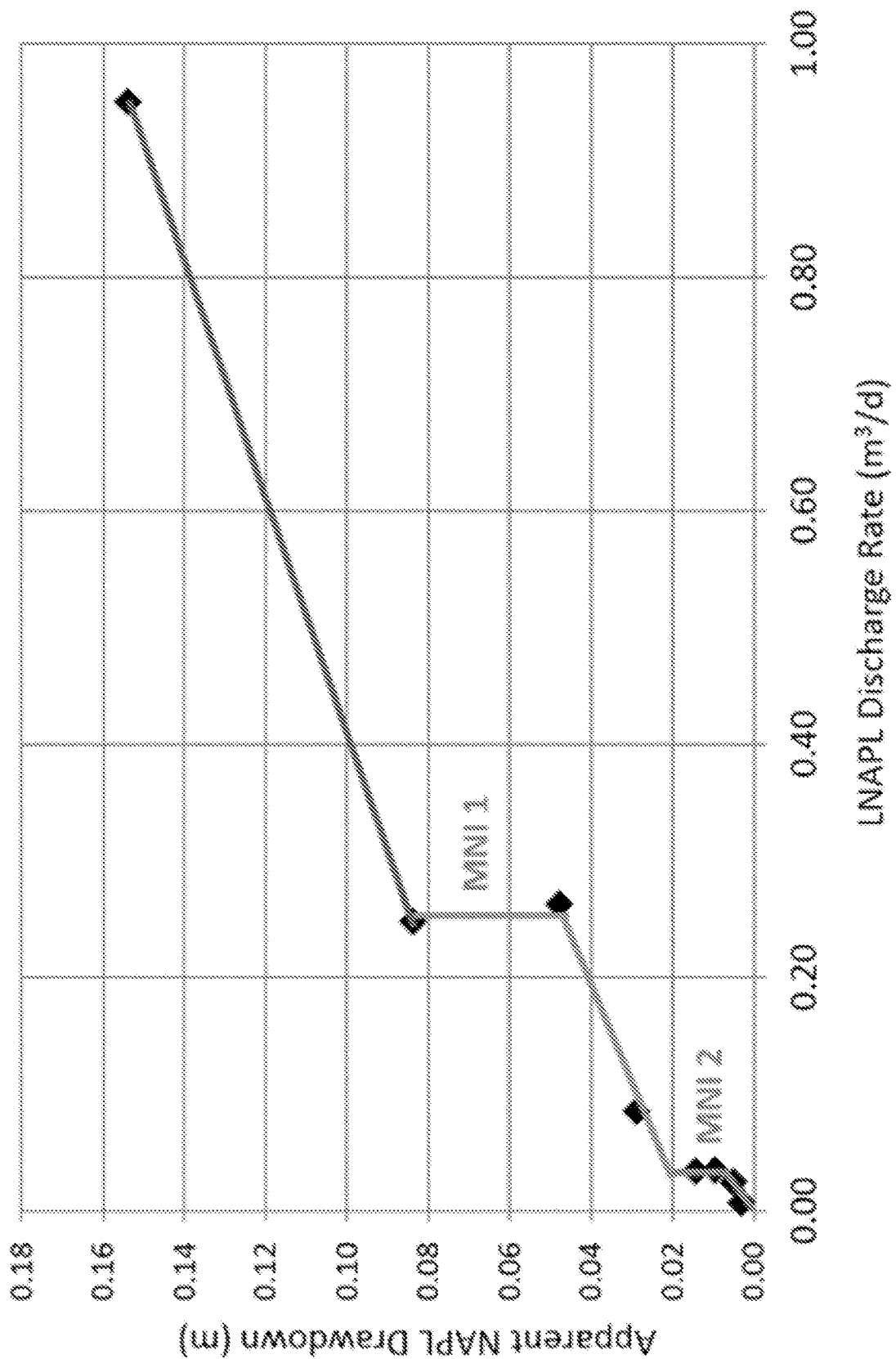
FIG. 13 shows a DvD plot for LNAPL recharging into example Well B.

The DvD from the test wells are shown in FIGS. 12 and 13. Three periods of constant discharge were identified for Well A and are shown in FIG. 12 (between 0.2 and 0.25, below 0.05, and slightly above 0). Two periods of constant discharge were identified for Well B in FIG. 13 (between 0.2 and 0.3 and between 0 and 0.2). An initially decreasing trend (far right sloping line) for Well B was interpreted to be filter pack recharge and excluded from analysis.

FIG. 12 shows a real-world DvD of LNAPL recharge into Well A. Note that recharge begins in the upper right and proceeds to zero values for discharge and drawdown in the lower left at the completion of LNAPL recharge to equilibrium conditions at the conclusion of the baildown test. Three MNIs were identified based on alternating periods of constant discharge with decreasing drawdown and linearly decreasing discharge with decreasing drawdown. The geometries, drawdown values, discharge rates, and calculated LNAPL transmissivities for each MNI and for the well in aggregate are provided in Table 1.

TABLE 1

MNI discharges, geometries, and calculated LNAPL transmissivity values for the test wells.

| Well ID | Interval | Discharge Rate ($m^3$/day) | MNI Top (m bgs) | MNI Bottom (m bgs) | MNI (m) | Transmissivity ($m^2$/day) |
|---|---|---|---|---|---|---|
| Well A | MNI 1 | 0.18 | 4.968 | 4.953 | 0.015 | 9 |
|  | MNI 2 | 0.03 | 4.947 | 4.946 | 0.001 | 25 |
|  | MNI 3 | 0.01 | 4.945 | 4.942 | 0.003 | 1.3 |
|  | Aggregate | 0.22 | NA | NA | 0.019 | 9 |

TABLE 1-continued

MNI discharges, geometries, and calculated LNAPL transmissivity values for the test wells.

| Well ID | Interval | Discharge Rate ($m^3$/day) | MNI Top (m bgs) | MNI Bottom (m bgs) | MNI (m) | Transmissivity ($m^2$/day) |
|---|---|---|---|---|---|---|
| Well B | MNI 1 | 0.22 | 4.951 | 4.929 | 0.022 | 7 |
|  | MNI 2 | 0.03 | 4.920 | 4.918 | 0.002 | 13 |
|  | Aggregate | 0.25 | NA | NA | 0.024 | 8 |

FIG. 13 shows a real-world DvD of LNAPL recharge into Well B. Note that recharge begins in the upper right and proceeds to zero values for discharge and drawdown in the lower left at the completion of LNAPL recharge to equilibrium conditions at the conclusion of the baildown test. Two MNIs were identified based on alternating periods of constant discharge with decreasing drawdown and linearly decreasing discharge with decreasing drawdown. The geometries, drawdown values, discharge rates, and calculated LNAPL transmissivities for each MNI and for the well in aggregate are provided in Table 1.

For both wells, the constant discharge rates as shown on the DvD are the raw discharge rates. The actual discharge rates for each MNI were estimated by adjusting the raw discharge rate to remove the discharge attributed to the other MNIs. The thickness of each MNI was calculated as the change in drawdown over each period of decreasing slope. The MNIs were correlated to depth based on the fluid interfaces at the beginning and end of each MNI. The critical parameters for each individual MNI, as well as an aggregate value for the well, are summarized in Table 1.

LNAPL transmissivity was calculated for each MNI and as a composite value for each well in aggregate using Equation 1. Because the LNAPL responded analogously to perched LNAPL in granular porous media, the maximum LNAPL drawdown for each MNI is equal to the thickness of the MNI as shown in Equation 3. The aggregate transmissivity assumes that the MNIs were combined into a single, continuous unit rather than isolated in individual fractures. The total discharge rate and total thickness of all MNIs was used in Equation 1. The results are summarized in Table 1.

Well A

Figure 14:
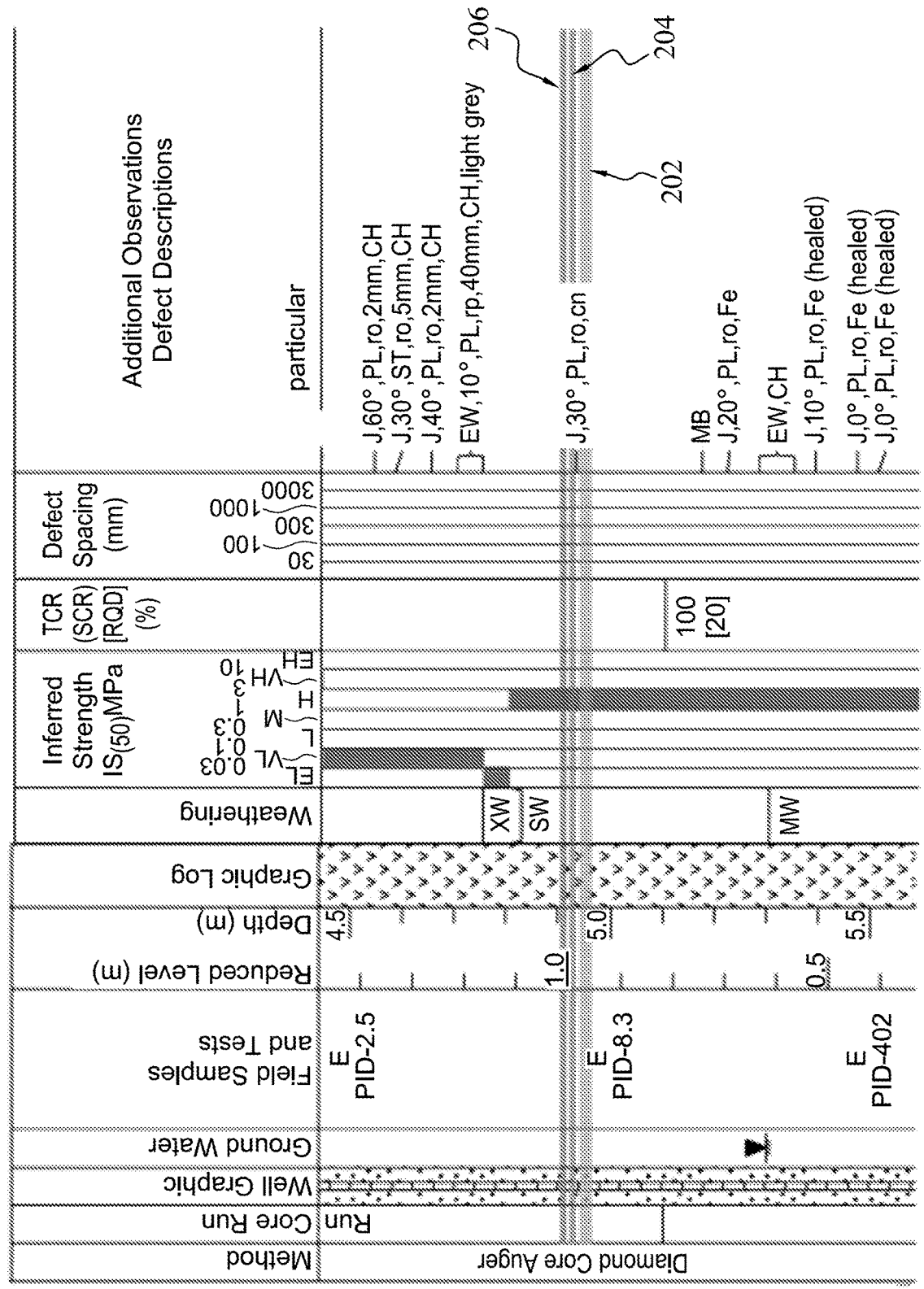
FIG. 14 shows an annotated well conceptual model (WLCM) depicting the correlated boring log for example Well A.

The results for Well A were correlated back to the boring log to enhance the understanding of the WLCM as shown in FIG. 14. MNI 1 (bottom shaded line 202) has the largest discharge rate (0.18 $m^3$/day) and thickest MNI (0.015 meter) identified. The estimated LNAPL transmissivity for this MNI is 9 $m^2$/day (97 $ft^2$/day).

The LNAPL transmissivity for MNI 2 (middle shaded line 204), 25 $m^2$/day (270 $ft^2$/day), is larger than that of MNI 1 despite a lower discharge rate, 0.03 $m^3$/day. This occurs because MNI 2 is only 0.001 meter thick. The discharge rate for MNI 3 (top shaded line 206) is similar to MNI 1, 0.01 $m^3$/day. However, the LNAPL transmissivity is lower, 1.3 $m^2$/day (14 $ft^2$/day), due to a larger MNI thickness.

Only one fracture is identified on the rock log at the elevation of the MNIs. While core photography was collected, the critical segment was not recovered during drilling. It was not possible to confirm if additional MNIs were visible in the core. This result highlights the importance of precise fluid elevation measurements as well as a detailed log and core photography in order to identify features on a millimeter scale.

The composite LNAPL transmissivity, assuming all the MNIs were continuous, is 9 $m^2$/day (97 $ft^2$/day). The estimated LNAPL transmissivity of each individual MNI, as well as the composite value, suggests the LNAPL is hydraulically recoverable at this location.

Well B

Figure 15:
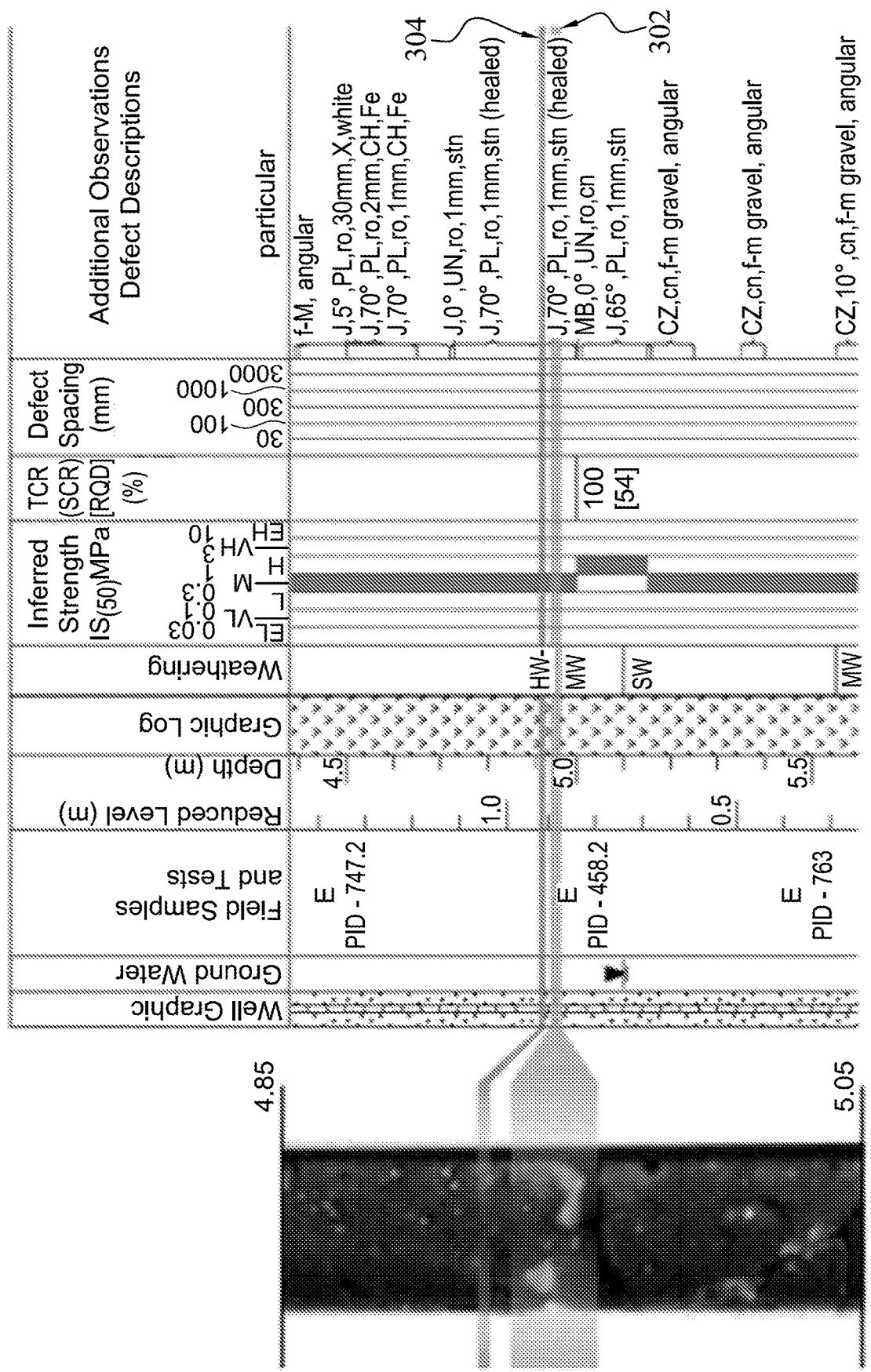
FIG. 15 shows an annotated WLCM depicting the correlated boring log for example Well B.

The results for Well B were correlated back to the boring log to enhance the understanding of the WLCM as shown in FIG. 15. MNI 1 (bottom shaded line 302) is the deepest and thickest MNI (0.022 meter) identified. Its location correlates to a planar fracture, visible in the core and noted on the log. The estimated LNAPL transmissivity of this MNI is 7 $m^2$/day (75 $ft^2$/day).

MNI 2 is just above MNI 1 (top shaded line 304). The discharge rate and MNI are an order of magnitude smaller than MNI 1. However, the LNAPL transmissivity of 13 $m^2$/day (140 $ft^2$/day) is higher due to the small associated drawdown. This MNI is not clearly visible in the core photograph, but it is within the overall extent of the fracture as noted on the log.

The composite LNAPL transmissivity, assuming all the MNIs were continuous, is 8 $m^2$/day (86 $ft^2$/day). The estimated LNAPL transmissivity of each individual MNI, as well as the composite value, suggests the LNAPL is hydraulically recoverable at this location.

Additional Examples

As used below, any reference to a series of examples is to be understood as a reference to each of those examples disjunctively (e.g., "Examples 1-4" is to be understood as "Examples 1, 2, 3, or 4").

Example 1 is a method of evaluating a distribution and recovery of a non-aqueous phase liquid (NAPL) in a subsurface comprising: identifying a plurality of mobile non-aqueous phase liquid intervals (MNI) in the subsurface; and determining a transmissivity of a non-aqueous phase liquid (NAPL) in the subsurface.

Example 2 is the method of example 1, wherein the non-aqueous phase liquid comprises light non-aqueous phase liquid (LNAPL).

Example 3 is the method of example 2, wherein determining the transmissivity of the non-aqueous phase liquid (NAPL) interface comprises: gauging the subsurface through a well to determine an apparent air NAPL interface (ANI); calculating an elevation of the apparent air NAPL interface (ANI) in the subsurface; recording the elevation of the apparent air NAPL interface (ANI); gauging the subsurface through a well to determine an NAPL water interface (NWI) in the subsurface; calculating an elevation of the NAPL water interface (NWI) in the subsurface; and recording the elevation of the NAPL water interface (NWI).

Example 4 is the method of example 1, wherein the non-aqueous phase liquid comprises dense non-aqueous phase liquid (DNAPL).

Example 5 is the method of example 4, wherein determining the transmissivity of the non-aqueous phase liquid (NAPL) interface comprises: gauging the subsurface through a well to determine an apparent NAPL water interface (NWI); calculating an elevation of the apparent NAPL water interface (NWI) in the subsurface; and recording the elevation of the apparent NAPL water interface (NWI); gauging the subsurface through a well to determine the base of the DNAPL and well total depth (TD) in the subsurface; calculating an elevation of the base of the DNAPL in the subsurface; and recording the elevation of the well TD.

Example 6 is the method of examples 3 or 5, wherein the gauging step comprises using a pressure transducer or electronic interface probe.

Example 7 is the method of example 1, wherein the identifying the mobile non-aqueous phase liquid intervals (MNI) comprises: removing an amount of non-aqueous phase liquid (NAPL) from the subsurface through a well; monitoring an apparent drawdown of the non-aqueous phase liquid (NAPL) in the well; monitoring a discharge rate of the non-aqueous phase liquid (NAPL) in the well from an area of the subsurface comprising non-aqueous phase liquid (NAPL) near the well; analyzing a rate of change for the discharge rate; analyzing a rate of change for the drawdown; and determining when the rate of change for the discharge rate and drawdown are substantially zero.

Example 8 is the method of example 7, wherein the amount of non-aqueous phase liquid (NAPL) removed is substantially all the non-aqueous phase liquid (NAPL) from the well at an equilibrium condition.

Example 9 is the method of example 1 further comprising quantifying a recoverability of non-aqueous phase liquid (NAPL) in the mobile non-aqueous phase liquid intervals (MNI).

Example 10 is the method of example 1, wherein the subsurface comprises a fractured porous media.

Example 11 is the method of example 10, further comprising correlating each identified mobile interval of non-aqueous phase liquid to a fracture within the fractured porous media.

Example 12 is the method of example 11, further comprising generating a well non-aqueous phase liquid conceptual model by comparing the correlation of identified interval of non-aqueous phase liquid and the fracture within the fractured porous media to a boring log for the subsurface.

Example 13 is the method of example 1, wherein the subsurface comprises a layered arrangement of granular porous media and non-porous media.

Example 14 is the method of example 13, further comprising correlating each identified mobile interval of non-aqueous phase liquid to a layer of granular porous media.

Example 15 is the method of example 14, further comprising generating a well non-aqueous phase liquid conceptual model by comparing the correlation of identified interval of non-aqueous phase liquid and the layer of granular porous media to a boring log for the sub surface.

Example 16 is a system for evaluating a distribution and recovery of a non-aqueous phase liquid (NAPL) in a subsurface comprising: a first component for determining a transmissivity of a non-aqueous phase liquid (NAPL) in the subsurface; and a second component for identifying a plurality of mobile non-aqueous phase liquid (NAPL) intervals (MNI) in the sub surface.

Example 17 is a method of evaluating a distribution and a recoverability of a dense non-aqueous phase liquid comprising: testing a transmissivity of the dense non-aqueous phase liquid; determining a high resolution mobile interval definition of the dense non-aqueous phase liquid; and integrating the definition into a conceptual site model.

Example 18 is the method of example 17, wherein the testing the transmissivity of the dense non-aqueous phase liquid comprises: placing a first transducer in the dense non-aqueous phase liquid; recording a first pressure measurement from the first transducer; calculating an elevation of the dense non-aqueous phase liquid; placing a second transducer in a water column near the dense non-aqueous phase liquid; recording a second pressure measurement from the second transducer; calculating an elevation of the water column; and comparing the elevation of the dense non-aqueous phase liquid to the elevation of the water column to determine a thickness of dense non-aqueous phase liquid.

Example 19 is the method of example 17, wherein the determining a high resolution mobile interval definition of the dense non-aqueous phase liquid comprises: measuring a first specific gravity of the dense non-aqueous phase liquid; measuring a second specific gravity of a water column; and performing a calibration using the first and second specific gravity measurements.

Example 20 is the method of example 19, wherein performing the calibration further comprises repeating said calibrations of the specific gravity and periodic manual measurements to refine the definition of the dense non-aqueous phase liquid.

Example 21 is a system for evaluating a distribution and a recoverability of a dense non-aqueous phase liquid comprising: a component for testing a transmissivity of the dense non-aqueous phase liquid; a component for determining a high resolution mobile interval definition of the dense non-aqueous phase liquid; and a component for integrating the definition into a conceptual site model.

Example 22 is the system of example 21, wherein the component for testing the transmissivity of the dense non-aqueous phase liquid comprises: a first transducer configured to be positioned in the dense non-aqueous phase liquid, so as to record a first pressure measurement; and a second transducer configured to be positioned in a water column near the dense non-aqueous phase liquid so as to record a second pressure measurement.

Example 23 is the system of example 22, wherein the component for determining a high resolution mobile interval definition of the dense non-aqueous phase liquid comprises an element to calculate an elevation of the dense non-aqueous phase liquid based on the first pressure measurement and an elevation of the water column based on the second pressure measurement, so as to compare the elevation of the dense non-aqueous phase liquid to the elevation of the water column to determine a thickness of dense non-aqueous phase liquid.

Example 24 is the system of example 23, wherein the determining a high resolution mobile interval definition of the dense non-aqueous phase liquid comprises measuring a first specific gravity of the dense non-aqueous phase liquid, measuring a second specific gravity of a water column, and performing a calibration using the first and second specific gravity measurements.

Example 25 is the system of example 24, wherein performing the calibration further comprises repeating said calibrations of the specific gravity and periodic manual measurements to refine the definition of the dense non-aqueous phase liquid.

REFERENCES

Adamski, M., V. Kremesec, R. Kolhatkar, C. Pearson, and B. Rowan. 2005. LNAPL in fine-grained soils: conceptualization of saturation, distribution, recovery, and their modeling. *Groundwater Monitoring and Remediation* 25, no. 1: 100-112.

API. 2012. *User Guide for the API LNAPL Transmissivity Workbook: A Tool for Baildown Test Analysis*. API Publication 46xx (pre-publication draft). API Regulatory and Scientific Affairs Department.

ASTM. 2014. ASTM E2531-06 (2014), Standard Guide for Development of Conceptual Site Models and Remediation Strategies for Light Nonaqueous-Phase Liquids Released to the Subsurface, ASTM International, West Conshohocken, Pa., 2014, www.astm.org ASTM. 2013. ASTM E2856-13, Standard Guide for Estimation of LNAPL Transmissivity, ASTM International, West Conshohocken, Pa., 2013, www.astm.org., 68 pp.

Bouwer, H., and R. C. Rice. 1976. A slug test method for determining hydraulic conductivity of unconfined aquifers with completely or partially penetrating wells. *Water Resources Research* 12, no. 3: 423-428.

Bouwer, Herman. 1989. The Bouwer and Rice Slug Test— An Update. *Ground Water* 27, no. 3: 304-309.

Charbeneau, Randall J., Russel T. Johns, Larry W. Lake, and Michael McAdams III. 2000. Free Product Recovery of Petroleum Hydrocarbon Liquids. *Groundwater Monitoring & Remediation* 20, no. 3: 147-158.

Charbeneau, Randall. 2007. *LNAPL Distribution and Recovery Model (LDRM) Volume 1: Distribution and Recovery of Petroleum Hydrocarbon Liquids in Porous Media*. Washington, D.C.: API Publication 4760.

Charbeneau, Randall, Andrew Kirkman, and Ranga Muthu. 2012. *API LNAPL Transmissivity Workbook: A tool for Baildown Test Analysis*. API Regulatory and Scientific Affairs Department Publication 46XX.

CLAIRE. 2014. *An illustrated handbook of LNAPL transport and fate in the subsurface*. CL:AIRE, London. ISBN 978-1-905046-24-9. Download at www.claire.co.uk/LNAPL Commonwealth of Massachusetts Department of Environmental Protection. 2016. *Light Nonaqueous Phase Liquids (LNAPL) and the MCP: Guidance for Site Assessment and Closure*.

Farr, A. M., Houghtalen, R. J., McWhorter, D. B. 1990. Volume estimation of light nonaqueous phase liquids in porous media. *Ground Water* 28, no. 1: 48-56. http://dx.doi.org/10.1111/j.1745-6584.1990.tb02228.x Freeze, R. A. and J. A. Cherry. 1979. Groundwater. Prentice-Hall, Englewood Cliffs, N.J.

Hawthorne, J. Michael. 2013. LNAPL Transmissivity from Total Fluids Recovery Data Part 1: Calculation Methodology. *Applied NAPL Science Review* 3, no. 2, February 2013.

Hawthorne, J. Michael. 2014a. Filtering Baildown Test Data. *Applied NAPL Science Review* 4, no. 2, March 2014.

Hawthorne, J. Michael. 2014b. Calculating NAPL Drawdown. *Applied NAPL Science Review* 4, no. 3, September 2014.

Hawthorne, J. Michael and Andrew Kirkman. 2011. Discharge versus Drawdown Graphs. *Applied NAPL Science Review* 1, no. 4, April 2011.

Hawthorne, J. Michael and Andrew J. Kirkman. 2013. LNAPL Transmissivity from Total Fluids Recovery Data Part 2: Application and Interpretation of Results. *Applied NAPL Science Review* 3, no. 3, April 2013.

Hawthorne, J. Michael, Andrew J. Kirkman, and Lisa Reyenga. 2016. Magnitude of Potential Errors in LNAPL Transmissivity Calculation in Complex Confined and Perched LNAPL Conditions. Battelle International Conference on Remediation of Chlorinated and Recalcitrant Compounds, May 2016.

Hawthorne, J. Michael, Mark Adamski, Sanjay Garg, and Andrew Kirkman. 2011a. Confined LNAPL. *Applied NAPL Science Review* 1, no. 5, May 2011.

Hawthorne, J. Michael, Mark Adamski, Sanjay Garg, and Andrew Kirkman. 2011b. Perched LNAPL. *Applied NAPL Science Review* 1, no. 6, June 2011.

Huntley, D. 2000. Analytic determination of hydrocarbon transmissivity from baildown tests. *Ground Water* 38, no. 1: 46-52.

ITRC (Interstate Technology & Regulatory Council). 2009. *Evaluating LNAPL remedial technologies for achieving project goals*. Interstate Technology and Regulatory Council, LNAPLs Team. http://www.itrcweb.org/guidance/getdocument?documentid=48

ITRC. 2016. Light Nonaqueous-Phase Liquids: Science, Management, and Technology Two Day Workshop. Interstate Technology and Regulatory Council, LNAPLs Team. 5 to 6 Apr. 2016, Atlanta, Ga.

Johnston, C. D. 2010. Selecting and Assessing Strategies for Remediating LNAPL in Soils and Aquifers. *Cooperative Research Centre for Contamination Assessment and Remediation of the Environment*, Technical Report series, no 18.

Kansas Department of Health and Environment. 2015. *Total Petroleum Hydrocarbons (TPH) and Light Non Aqueous Phase Liquid (LNAPL) Characterization, Remediation and Management*.

Kirkman, Andrew J, Mark Adamski and J. Michael Hawthorne. 2012. Identification and Assessment of Confined and Perched LNAPL Conditions. *Groundwater Monitoring and Remediation* 33, no. 1: 105-110.

Kirkman, Andrew J. 2012. Refinement of Bouwer-Rice Baildown Test Analysis. *Groundwater Monitoring and Remediation* 33, no. 1: 75-86.

Kirkman, Andrew and J. Michael Hawthorne. 2013. Manual Skimming Testing to Measure LNAPL Transmissivity. *Applied NAPL Science Review* 3, no. 1, January 2013.

Lenhard, R. J., Parker, J. C. 1990a. Estimation of free hydrocarbon volume from fluid levels in monitoring wells. *Ground Water* 28, no. 1: 57-67. http://dx.doi.org/10.1111/j.1745-6584.1990.tb02229.x Lundy, D. A., and L. M. Zimmerman. 1996. Assessing the recoverability of LNAPL plumes for recovery system conceptual design. *In Proceedings of the 10th Annual National Outdoor Action Conference and Exposition*, National Ground Water Association, May 13-15, Las Vegas, Nev., pp. 19-34.

Quinn, P. M., J. A. Cherry, and B. L. Parker. 2011. Quantification of non-Darcian flow observed during packer testing in fractured sedimentary rock. *Water Resources Research* 47, W09533, doi:10.1029/2010WR009681.

Reyenga, Lisa and J. Michael Hawthorne. 2015. The Mobile NAPL Interval, Part 2: Confined and Perched LNAPL. *Applied NAPL Science Review* 5, no. 4, December 2015.

Thies, Charles V. 1952. The Relation Between the Lowering of the Piezometric Surface and the Rate and Duration of Discharge of a Well Using Ground Water Storage. *United States Department of the Interior Geological Survey*

Water Resources Division Ground Water Branch Groundwater Notes Hydraulics 5, Aug. 1952.

Zhu, J. L., J. C. Parker, D. A. Lundy, and L. M. Zimmerman. 1993. Estimation of soil properties and free product volume from baildown tests chemicals. *In Proc. Petroleum Hydrocarbons and Organic Chemicals in Ground Water,* 99-111. Dublin, Ohio: National Water Well Association.

What is claimed is:

1. A method of evaluating a distribution and recovery of a non-aqueous phase liquid (NAPL) in a subsurface comprising:
    removing a volume of non-aqueous phase liquid (NAPL) from the subsurface through a well and identifying a plurality of mobile non-aqueous phase liquid intervals (MNI) in the sub surface;
    gauging the subsurface with at least one of a pressure transducer or an electronic interface probe to determine a transmissivity of a non-aqueous phase liquid (NAPL) in the subsurface; and
    quantifying a recoverability of non-aqueous phase liquid (NAPL) in the mobile non-aqueous phase liquid intervals (MNI),
    wherein the subsurface comprises a fractured porous media or a layered arrangement of granular porous media and non-porous media.

2. The method of claim 1, wherein the non-aqueous phase liquid comprises light non-aqueous phase liquid (LNAPL).

3. The method of claim 2, wherein determining the transmissivity of the non-aqueous phase liquid (NAPL) interface comprises:
    gauging the subsurface through a well to determine an apparent air NAPL interface (ANI);
    calculating an elevation of the apparent air NAPL interface (ANI) in the subsurface;
    recording the elevation of the apparent air NAPL interface (ANI);
    gauging the subsurface through a well to determine an NAPL water interface (NWI) in the subsurface;
    calculating an elevation of the NAPL water interface (NWI) in the subsurface; and
    recording the elevation of the NAPL water interface (NWI).

4. The method of claim 1, wherein the non-aqueous phase liquid comprises dense non-aqueous phase liquid (DNAPL).

5. The method of claim 4, wherein determining the transmissivity of the non-aqueous phase liquid (NAPL) interface comprises:
    gauging the subsurface through a well to determine an apparent NAPL water interface (NWI);
    calculating an elevation of the apparent NAPL water interface (NWI) in the subsurface;
    recording the elevation of the apparent NAPL water interface (NWI);
    gauging the subsurface through a well to determine a base of the DNAPL and well total depth (TD) in the subsurface;
    calculating an elevation of the base of the DNAPL in the subsurface; and
    recording the elevation of the well TD.

6. The method of claim 1, wherein the identifying the mobile non-aqueous phase liquid intervals (MNI) comprises:
    monitoring an apparent drawdown of the non-aqueous phase liquid (NAPL) in the well;
    monitoring a discharge rate of the non-aqueous phase liquid (NAPL) in the well from an area of the subsurface comprising non-aqueous phase liquid (NAPL) near the well;
    analyzing a rate of change for the discharge rate;
    analyzing a rate of change for the drawdown; and
    determining when the rate of change for the discharge rate and drawdown are substantially zero.

7. The method of claim 6, wherein the volume of non-aqueous phase liquid (NAPL) removed is substantially all the non-aqueous phase liquid (NAPL) from the well at an equilibrium condition.

8. The method of claim 1, further comprising correlating each identified mobile interval of non-aqueous phase liquid to a fracture within the fractured porous media or to a layer of granular porous media.

9. The method of claim 8, further comprising generating a well non-aqueous phase liquid conceptual model by comparing the correlation of each identified mobile interval of non-aqueous phase liquid to a boring log for the subsurface.

10. A system for evaluating a distribution and recovery of a non-aqueous phase liquid (NAPL) in a subsurface according to the method of claim 1, the system comprising:
    a first pressure transducer or electronic interface probe to gauge the subsurface to determine a transmissivity of a non-aqueous phase liquid (NAPL) in the subsurface; and
    a second pressure transducer or electronic interface probe to gauge the subsurface to identify a plurality of mobile non-aqueous phase liquid (NAPL) intervals (MNI) in the sub surface.

11. A method of evaluating a distribution and a recoverability of a dense non-aqueous phase liquid (DNAPL) comprising:
    testing a transmissivity of the dense non-aqueous phase liquid (DNAPL), wherein the testing the transmissivity of the dense non-aqueous phase liquid (DNAPL) comprises:
        placing a first transducer in the dense non-aqueous phase liquid (DNAPL);
        recording a first pressure measurement from the first transducer;
        calculating an elevation of the dense non-aqueous phase liquid;
        placing a second transducer in a water column near the dense non-aqueous phase liquid (DNAPL);
        recording a second pressure measurement from the second transducer;
        calculating an elevation of the water column; and
        comparing the elevation of the dense non-aqueous phase liquid (DNAPL) to the elevation of the water column to determine a thickness of dense non-aqueous phase liquid (DNAPL);
    determining a mobile interval definition of the dense non-aqueous phase liquid (DNAPL), wherein the determining a mobile interval definition of the dense non-aqueous phase liquid (DNAPL) comprises:
        measuring a first specific gravity of the dense non-aqueous phase liquid (DNAPL);
        measuring a second specific gravity of a water column; and
        performing a calibration using the first and second specific gravity measurements;
    integrating the definition into a conceptual site model; and
    quantifying a recoverability of the dense non-aqueous phase liquid (DNAPL), wherein a subsurface for recoverability comprises a fractured porous media or a layered arrangement of granular porous media and non-porous media.

12. The method of claim 11, wherein performing the calibration further comprises repeating said measurements of the specific gravity to refine the definition of the dense non-aqueous phase liquid (DNAPL).

13. The method of claim 11, wherein the dense non-aqueous phase liquid (DNAPL) comprises coal tar, creosote, chlorinated solvents, polychlorinated biphenyl (PCBs), mercury, and extra heavy crude oil, or combinations thereof.

14. A method of evaluating a distribution and recovery of a non-aqueous phase liquid (NAPL) in a subsurface comprising:
  identifying a plurality of mobile non-aqueous phase liquid intervals (MNI) in the subsurface, wherein the identifying comprises:
    removing an amount of non-aqueous phase liquid (NAPL) from the subsurface through a well, wherein the amount of non-aqueous phase liquid (NAPL) removed is substantially all the non-aqueous phase liquid (NAPL) from the well at an equilibrium condition;
    monitoring an apparent drawdown of the non-aqueous phase liquid (NAPL) in the well;
    monitoring a discharge rate of the non-aqueous phase liquid (NAPL) in the well from an area of the subsurface comprising non-aqueous phase liquid (NAPL) near the well;
    analyzing a rate of change for the discharge rate;
    analyzing a rate of change for the drawdown; and
    determining when the rate of change for the discharge rate and drawdown are substantially zero;
  determining a transmissivity of a non-aqueous phase liquid (NAPL) in the subsurface wherein determining comprises gauging the subsurface with at least one of a pressure transducer or an electronic interface probe; and
  quantifying a recoverability of non-aqueous phase liquid (NAPL) in the mobile non-aqueous phase liquid intervals (MNI).

15. The method of claim 14, wherein the non-aqueous phase liquid comprises light non-aqueous phase liquid (LNAPL) and wherein determining the transmissivity of the non-aqueous phase liquid (NAPL) interface comprises:
  gauging the subsurface through a well to determine an apparent air NAPL interface (ANI);
  calculating an elevation of the apparent air NAPL interface (ANI) in the subsurface;
  recording the elevation of the apparent air NAPL interface (ANI);
  gauging the subsurface through a well to determine an NAPL water interface (NWI) in the subsurface;
  calculating an elevation of the NAPL water interface (NWI) in the subsurface; and
  recording the elevation of the NAPL water interface (NWI).

16. The method of claim 14, wherein the non-aqueous phase liquid comprises dense non-aqueous phase liquid (DNAPL), and wherein determining the transmissivity of the non-aqueous phase liquid (NAPL) interface comprises:
  gauging the subsurface through a well to determine an apparent NAPL water interface (NWI);
  calculating an elevation of the apparent NAPL water interface (NWI) in the subsurface;
  recording the elevation of the apparent NAPL water interface (NWI);
  gauging the subsurface through a well to determine a base of the DNAPL and well total depth (TD) in the subsurface;
  calculating an elevation of the base of the DNAPL in the subsurface; and
  recording the elevation of the well TD.

17. The method of claim 14, wherein the subsurface comprises a fractured porous media or a layered arrangement of granular porous media and non-porous media.

18. The method of claim 17, further comprising correlating each identified mobile interval of non-aqueous phase liquid to a fracture within the fractured porous media or to a layer of granular porous media.

19. The method of claim 18, further comprising generating a well non-aqueous phase liquid conceptual model by comparing the correlation of each identified mobile interval of non-aqueous phase liquid to a boring log for the subsurface.

* * * * *